(12) United States Patent
Claise et al.

(10) Patent No.: US 11,539,600 B2
(45) Date of Patent: **\*Dec. 27, 2022**

(54) CLOSED LOOP AUTOMATION FOR INTENT-BASED NETWORKING

(71) Applicant: Cisco Technology, Inc., San Jose, CA (US)

(72) Inventors: Benoit Claise, Othée (BE); Carlos M. Pignataro, Cary, NC (US); Eric Vyncke, Alleur (BE); Joseph M. Clarke, Cary, NC (US); Mioljub Jovanovic, Woluwe Saint Lambert (BE); Harjinder Singh, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,971

(22) Filed: Nov. 2, 2021

(65) Prior Publication Data

US 2022/0060394 A1 Feb. 24, 2022

Related U.S. Application Data

(63) Continuation of application No. 16/592,866, filed on Oct. 4, 2019, now Pat. No. 11,218,380.

(51) Int. Cl.
*H04L 41/5009* (2022.01)
*H04L 41/046* (2022.01)
(Continued)

(52) U.S. Cl.
CPC ........ *H04L 41/5009* (2013.01); *H04L 41/046* (2013.01); *H04L 41/5025* (2013.01); *H04L 41/5032* (2013.01)

(58) Field of Classification Search
CPC ............... H04L 41/5009; H04L 41/046; H04L 41/5025; H04L 41/5032
See application file for complete search history.

(56) References Cited

U.S. PATENT DOCUMENTS

| | | | |
|---|---|---|---|
| 9,059,941 B1 | 6/2015 | Oweis et al. | |
| 9,304,815 B1 * | 4/2016 | Vasanth | G06F 9/4881 |
| | (Continued) | | |

FOREIGN PATENT DOCUMENTS

| | | |
|---|---|---|
| EP | 1 206 085 A2 | 5/2002 |
| EP | 3467644 A1 | 4/2019 |
| | (Continued) | |

OTHER PUBLICATIONS

Cisco, "Intent-Based Networking", White paper Cisco public, Jan. 2018, 11 pages.

(Continued)

*Primary Examiner* — Wing F Chan
*Assistant Examiner* — Billy H Ng
(74) *Attorney, Agent, or Firm* — Edell, Shapiro & Finnan, LLC

(57) ABSTRACT

A method is performed at one or more entities configured to configure and provide assurance for a service enabled on a network. The service is configured as a collection of subservices on network devices of the network. A definition of the service is decomposed into a subservice dependency graph that indicates the subservices and dependencies between the subservices that collectively implement the service. Based on the subservice dependency graph, the subservices are configured to record and report subservice metrics indicative of subservice health states of the subservices. The subservice metrics are obtained from the subservices, and the subservice health states of the subservices are determined based on the subservice metrics. A health state of (Continued)

the service is determined based on the subservice health states. One or more of the subservices are reconfigured based on the health state of the service.

20 Claims, 21 Drawing Sheets

(51) Int. Cl.
*H04L 41/5025* (2022.01)
*H04L 41/50* (2022.01)

(56) References Cited

U.S. PATENT DOCUMENTS

| | | | |
|---|---|---|---|
| 9,929,923 B2 | 3/2018 | Heinz et al. | |
| 9,992,082 B2 | 6/2018 | Macneil et al. | |
| 10,277,461 B1* | 4/2019 | A | H04L 41/5054 |
| 10,372,520 B2 | 8/2019 | Johnston et al. | |
| 10,637,744 B2 | 4/2020 | Carroll et al. | |
| 2005/0181835 A1 | 8/2005 | Lau et al. | |
| 2011/0261049 A1 | 10/2011 | Cardno | |
| 2012/0215912 A1* | 8/2012 | Houlihan | G06F 9/5072 709/224 |
| 2014/0075248 A1 | 3/2014 | Sevilmis et al. | |
| 2016/0182320 A1* | 6/2016 | Bartfai-Walcott | H04L 41/145 709/224 |
| 2017/0289060 A1 | 10/2017 | Aftab et al. | |
| 2018/0307712 A1 | 10/2018 | Baradaran et al. | |
| 2019/0028909 A1 | 1/2019 | Mermoud et al. | |
| 2019/0104019 A1* | 4/2019 | Makovsky | H04L 41/0618 |
| 2019/0132213 A1 | 5/2019 | Na et al. | |
| 2019/0253328 A1 | 8/2019 | Kolar et al. | |

FOREIGN PATENT DOCUMENTS

| | | |
|---|---|---|
| WO | 2016089921 A1 | 6/2016 |
| WO | 2017129248 A1 | 8/2017 |

OTHER PUBLICATIONS

Path Solutions, "Root- Cause Troubleshooting for Your Entire Network", Path Solutions Inc., 2019, 2 pages.
Vmware, "Vmware Smart Assurance", VMWare, Inc., Palo Alto, CA, 2019, 4 pages.
International Search Report and Written Opinion in counterpad International Application No. PCT/US2020/052645, mailed Dec. 11, 2020, 15 pages.

* cited by examiner

```
                                                                    300
     ┌  At path rpc-reply/data/devices/device[sain-pe-1]/config/interface/GigabitEthernet:
302 ─┤  <GigabitEthernet xmlns="http://tail-f.com/ned/cisco-ios-xr"
     └  xmlns:nc="urn:ietf:params:xml:ns:netconf:base:1.0" refcounter="2" backpointer="[
304 ─── /ncs:services/l2vpn:l2vpn-p2p[l2vpn:vpn-id='xyz']]">
306 ───── <id>0/0/0/3</id>
          <description>to sain-ce-1</description>
308 ───── <mtu refcounter="1">4010</mtu>
     ┌  <ipv4>
     │   <address>
     │    <ip>10.1.0.2</ip>
310 ─┤    <mask>255.255.255.252</mask>
     │   </address>
     └  </ipv4>
     ┌  <ipv6>
     │   <address>
     │    <prefix-list>
312 ─┤     <prefix>2001:420:44ff:1a0a:1:1:0:b/126</prefix>
     │    </prefix-list>
     │   </address>
     └  </ipv6>
        <cdp/>
        </GigabitEthernet>
```

402 — At path rpc-reply/data/devices/device[sain-pe-2]/config/policy-map[xyz-IN]:
<policy-map xmlns="http://tail-f.com/ned/cisco-ios-xr"
xmlns:nc="urn:ietf:params:xml:ns:netconf:base:1.0" refcounter="1" backpointer="[
406 — /ncs:services/l2vpn:l2vpn-p2p[l2vpn:vpn-id='xyz'] ]">
  <name>xyz-IN</name>
  <class>
   <class-default refcounter="1" backpointer="[ /ncs:services/l2vpn:l2vpn-p2p[l2vpn:vpn-
id='xyz'] ]">
408 —    <map>class-default</map>
    <police-rate-unit>
     <police>
      <rate>
410        <cir refcounter="1">10</cir>
       <cir-unit refcounter="1">mbps</cir-unit>
      </rate>
     </police>
    </police-rate-unit>
    <set>
     <mpls>
      <experimental>
       <imposition refcounter="1">5</imposition>
      </experimental>
     </mpls>
    </set>
   </class-default>
  </class>
</policy-map>

502 {
At path rpc-reply/data/devices/device[sain-pe-2]/config/l2vpn:
<l2vpn xmlns="http://tail-f.com/ned/cisco-ios-xr"
xmlns:nc="urn:ietf:params:xml:ns:netconf:base:1.0" refcounter="1" backpointer="[
/ncs:services/l2vpn:l2vpn-p2p[l2vpn:vpn-id='xyz'] ]">

504 {
  <xconnect>
    <group refcounter="1" backpointer="[ /ncs:services/l2vpn:l2vpn-p2p[l2vpn:vpn-id='xyz'] ]">
      <name>l2vpn</name>
      <p2p refcounter="1" backpointer="[ /ncs:services/l2vpn:l2vpn-p2p[l2vpn:vpn-id='xyz'] ]">
        <name>P2P_xyz</name>
        <interface refcounter="1" backpointer="[ /ncs:services/l2vpn:l2vpn-p2p[l2vpn:vpn-id='xyz'] ]">
          <name>GigabitEthernet0/0/0/2.600</name> — 506
        </interface>
        <neighbor refcounter="1" backpointer="[ /ncs:services/l2vpn:l2vpn-p2p[l2vpn:vpn-id='xyz'] ]">
          <address>192.168.0.17</address> — 508
          <pw-id>11000</pw-id>
          <ip-version refcounter="1">ipv4</ip-version>
          <pw-class refcounter="1">SAIN_PW_CLASS</pw-class>
        </neighbor>
      </p2p>
    </group>
  </xconnect>
</l2vpn>

902 — ISISHealthy
Check whether IS-IS is healthy from a global point of view

904 — Arguments
- device: Device where the global IS-IS health for one area is checked display level = routing web_label = IS-IS global heath computed on {device}

Expressions

906 — Measure
- isis_ipv4_routes: List valid IPv4 IS-IS routes
  - device = device
- isis_ipv6_routes: List valid IPv6 IS-IS routes
  - device = device 908 — Compute
- ipv4_routes_count: number of elements/routes in 'isis_ipv4_routes'
  - Len(isis_ipv4_routes)
- ipv6_routes_count: number of elements/routes in 'isis_ipv6_routes'
  - Len(isis_ipv6_routes)
- average_ipv4_isis-routes_count: trailing average of IPv4 IS-IS routes
  - Mean(ipv4_routes_count, 20)
- average_ipv6_isis-routes_count: trailing average of IPv6 IS-IS routes
  - Mean(ipv6_routes_count, 20)
- ipv4_isis_routes_stability: IPv4 IS-IS routes baselining
  degraded if false: IPv4 routes unstable
  - Baseline(average_ipv4_isis_routes_count, 120)
- ipv6_isis_routes_stability: IPv6 IS-IS routes baselining
  degraded if false: IPv6 routes unstable
  - Baseline(average_ipv6_isis_routes_count, 120)

910 — - ISISHealthy: status of the subservice
  - Combine(ipv4_isis_routes_stability, ipv6_isis_routes_stability)

FIG.9

CLOSED LOOP AUTOMATION FOR INTENT-BASED NETWORKING

CROSS-REFERENCE TO RELATED APPLICATIONS

This application is a continuation of U.S. patent application Ser. No. 16/592,866, filed Oct. 4, 2019, the entire contents of which are incorporated herein by reference.

TECHNICAL FIELD

The present disclosure relates to assurance of services enabled on networks.

BACKGROUND

A compulsory step for intent-based networking involves closing a loop with telemetry for service assurance. Discovering whether a service fulfills its service level agreement (SLA) is relatively easy when monitoring synthetic traffic mimicking the service. However, such an over-the-top mechanism only provides SLA compliance results that considers a network on which the service is enabled as a "black box," without knowledge of inner workings or low-level components of the service. Therefore, a network operator tasked with the monitoring of the service has limited or no insights on which specific degraded or faulty network components/features are responsible for service degradation. This issue is particularly difficult when the network is composed of heterogeneous network components. Telemetry exists today to report operational information, but an issue arises in that telemetry from network devices in the network does not provide service context information. Hence, troubleshooting the service based on the telemetry is very complex, with, on one side, the service information, and on another side, network device-specific telemetry information. In the event that the network operator discovers that a service is underperforming, e.g., is not fulfilling its SLA, it may be near impossible for the network operator to identify in an efficient manner which low-level components of the service are responsible for such underperformance. The inability to identify efficiently the problematic low-level components hampers efforts to make repairs at the component-level in order to restore acceptable performance to the service.

BRIEF DESCRIPTION OF THE DRAWINGS

FIG. 3 is an illustration of service configuration information for a first network device and an interface on the first network device for a specific service, according to an example embodiment.

FIG. 4 is an illustration of service configuration information for a second network device and an interface on the second network device for the specific service, according to an example embodiment.

FIG. 5 is an illustration of service configuration information for a first cross-connect (xconnect) associated with the second network device for the specific service, according to an example embodiment.

FIG. 9 is an illustration of a heuristic package for a network protocol implemented on a network device used for the service, according to an example embodiment.

DESCRIPTION OF EXAMPLE EMBODIMENTS

Overview

A method is performed at one or more entities configured to configure and provide assurance for a service enabled on a network. The service is configured as a collection of subservices on network devices of the network. A definition of the service is decomposed into a subservice dependency graph that indicates the subservices and dependencies between the subservices that collectively implement the service. Based on the subservice dependency graph, the subservices are configured to record and report subservice metrics indicative of subservice health states of the subservices. The subservice metrics are obtained from the subservices, and the subservice health states of the subservices are determined based on the subservice metrics. A health state of the service is determined based on the subservice health states. One or more of the subservices are reconfigured based on the health state of the service.

Example Embodiments

Service Assurance for Intent-Based Networking (SAIN)

Figure 1A:
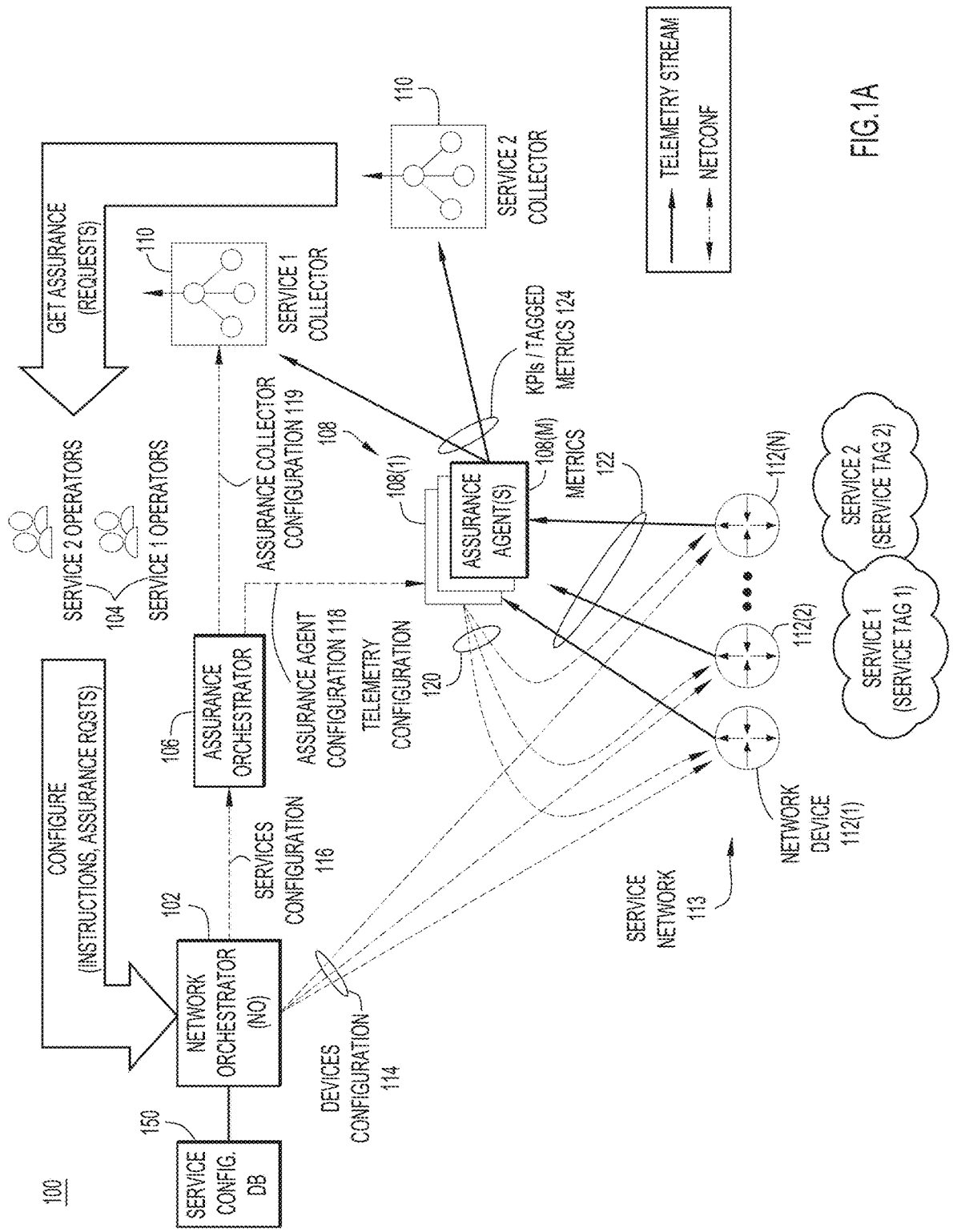
FIG. 1A is a block diagram of a network service assurance system or architecture (also referred to as a "service assurance system"), according to an example embodiment.

With reference to FIG. 1A, there is a block diagram of an example network service assurance system or architecture 100 (also referred to herein as a "service assurance system" 100). Service assurance system 100 may provide service assurance for intent-based networking (SAIN), for example. The service assurance system 100 leverages programming capabilities of network devices in the intent-based network (also referred to as a "service network" or simply a "network"), and model/event driven metrics in telemetry obtained from the network devices, to deliver end-to-end service assurance for various services. Service assurance system 100 includes a network orchestrator (NO) 102, service operators 104 to provide instructions to the network orchestrator 102, an assurance orchestrator 106 that communicates with the network orchestrator 102, assurance agents 108(1)-108(M) (collectively, "assurance agents" 108) that communicate with the assurance orchestrator 106, assurance collectors 110 that communicate with the assurance agents 108 and the service operators 104, and network devices 112(1)-112(N) (collectively, "network devices" 112) that communicate with the network orchestrator 102 and the assurance collectors 110. Network orchestrator 102 configures network devices 112(1)-112(N) to implement an intent-based service network 113 enabled to provide a variety of services to end users. Network devices 112 may include routers, switches, gateways, and other network devices (physical or virtual). Assurance orchestrator 106, assurance agents 108, and assurance collectors 110 are generally referred to as one or more "assurance entities" (or simply "entities") configured to provide assurance for services on a network.

Network orchestrator 102 may include applications and/or services hosted on one or more server devices (more simply referred to as servers), for example, in a cloud-based data center. Assurance orchestrator 106 may also include applications and/or services hosted on one or more server devices, which may be the same as or different from the servers used by network orchestrator 102. Similarly, assurance collectors 110 may also include applications and/or services hosted on one or more servers, which may be the same as or different from the servers used by assurance orchestrator 106. In an embodiment, assurance collectors 110 are applications integrated into assurance orchestrator 106. Assurance agents 108(1)-108(N) may each include applications and/or services hosted on one or more servers, and may be distributed geographically to be near respective ones of network devices 112(1)-112(N) enabled for services to be monitored under control of the assurance agents. Network orchestrator 102, assurance orchestrator 106, assurance agents 108, assurance collectors 110, and network devices 112 may communicate with each other over one or more communication networks, including one or more wide area networks (WANs), such as the Internet, and one or more local area networks (LANs).

In the example of FIG. 1A, service assurance system 100 supports multiple services, including service 1 and service 2 (collectively, "the services"). To this end, service operators 104 include a service 1 operator for service 1 and a service 2 operator for service 2, and assurance collectors 110 include a service 1 collector for service 1 and a service 2 collector for service 2. Service operators 104 (e.g., service 1 operator and service 2 operator) provide to network orchestrator 102 network and service intent-based instructions to setup/configure the services (e.g., service 1 and service 2) for end users. Service operators 104 also receive requests for assurance (e.g., "get assurance" requests) for the services from assurance collectors 110 (e.g., service 1 collector and service 2 collector), and forward the requests to network orchestrator 102.

Network Orchestrator

Responsive to the aforementioned instructions and the requests sent by service operators 104, network orchestrator 102 derives and sends to network devices 112 intent-based network device configuration information 114 to configure the network devices/service network 113 for the services (e.g., for service 1 and service 2). In addition, network orchestrator 102 derives and sends to assurance orchestrator 106 service configuration information 116 for providing assurance for the services (e.g., service 1 and service 2) enabled on service network 113. Service configuration information 116 includes, for each service deployed or implemented on service network 113, respectively, a definition of the service, including a service type (e.g., a type of network connectivity), a service instance (e.g., an identifier or name of the service), and configuration information that describes how the service is actually implemented of service network 113. That is, the definition of the configuration of the service is reflective of how the service is instantiated as a collection of the subservices in service network 113.

For network device configuration information 114, network orchestrator 102 may employ, for example, the Network Configuration Protocol (NETCONF) (or, similarly, Representational State Transfer (REST) Configuration (RESTCONF)) to push intent-based network device configuration objects, such as Yet Another Next Generation (YANG) models or objects, to network devices 112. Similarly, for services configuration information 116, network orchestrator 102 may also employ, for example, NETCONF to push intent-based service configuration YANG objects to assurance orchestrator 106. YANG is a data modeling language used to define data sent over a NETCONF compliant network to configure resources. NETCONF are used to install, manipulate, and delete configurations of the resources, while YANG is used to model both configuration and state data of the resources. YANG models/objects used to implement embodiments presented herein may include YANG models/objects extended to include service-specific metadata annotations in accordance with RFC 7952, for example, or any other format that may be the subject of a future standard.

Network orchestrator 102 configures a wide range of different subservices on one or more of network devices 112 to enable/support each of the services on service network 113. To do this, network orchestrator (i) generates subservice configuration information that includes network device configuration commands/instructions and associated configuration parameters for the subservices to be configured, and (ii) pushes the subservice configuration information to network devices 112 in network device configuration information 114, as mentioned above. Network orchestrator 102 also provides the subservice configuration information to assurance orchestrator 106 in service configuration information 116, as mentioned above.

Figure 1B:
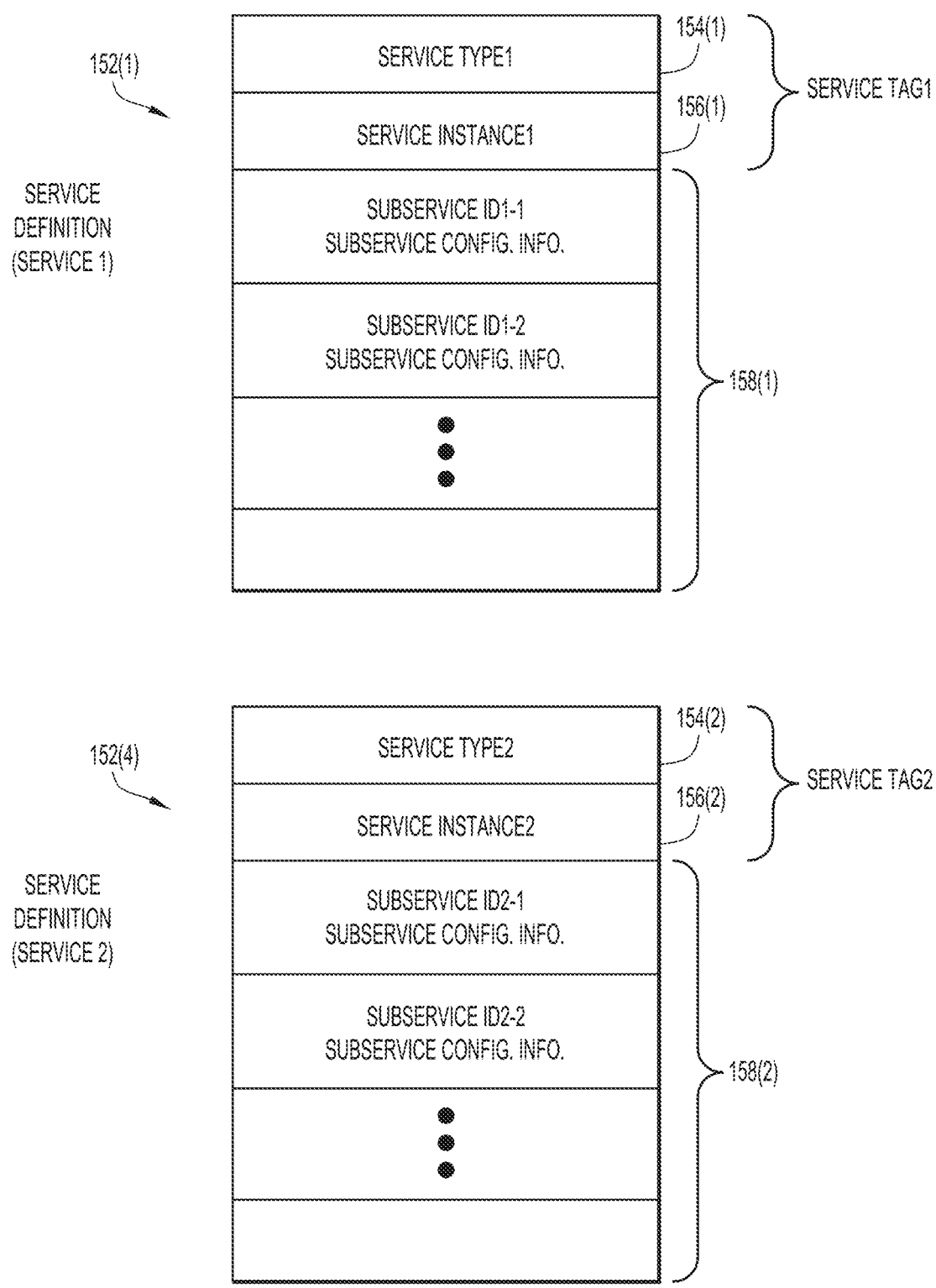
FIG. 1B is an illustration of a service configuration database in the network assurance system, according to an example embodiment.

Network orchestrator 102 stores in a service configuration database (DB) 150 a definition of each of the services that the network service orchestrator configures on service network 113. In an example, service configuration database 150 may be hosted on network orchestrator 102. With reference to FIG. 1B, there is an illustration of an example of service configuration database 150. In the example of FIG. 1B, service configuration database 150 stores definitions 152(1) and 152(2) (also referred to as "service definitions") for service 1 and service 2, from FIG. 1A. Each definition 152(i) may be similar to or the same as the definition of a service described above. Each definition 152(i) may include a service type 154(i) and a service instance 156(i) for the service to which the service definition pertains, and configuration information 158(i) that describes how that service is actually implemented/configured on service network 113. More specifically, configuration information 158(i) for a given service includes, for each of the subservices of the given service, a respective subservice identifier (ID) (e.g., subservice IDI-1, subservice IDI-2, and so on), and respective subservice configuration information (e.g., specific operations and/or intent-based network device configuration objects used to configure that subservice on a network device). Network orchestrator 102 may use a service type, a service instance, and a subservice identifier of a subservice as indexes into service configuration database 150 to search for and find respective subservice configuration information for the subservice.

Non-limiting examples of subservices that network orchestrator 102 may configure include layer 1 (L1), layer 2 (L2), and layer 3 (L3) connections/interfaces, packet routing protocols, logical network overlays such as equal-cost multi-path routing (ECMP), and subservices related to traffic shaping. Non-limiting examples of operations employed by network orchestrator 102 to configure the aforementioned example subservices, on a network device among network devices 112, are provided below.

To configure an L1 connection/interface:
a. Enter L1 interface configuration mode.
b. Configure on the network device components and interface parameters, including hardware parameters, memory buffers, optical transmit power, and optical encoding/modulation employed by optical interfaces on the network device.
c. Exit the L1 interface configuration mode.

To configure an L2 connection/interface:
a. Select a type of interface (i.e., L2, virtual LAN (VLAN), port-channel).
b. Enter L2 interface configuration mode.
c. Assign a media access control (MAC) address, a maximum transmission unit (MTU), and an L2 Quality-of-Service (QoS) classification (referred to simply as "QoS").
d. Enable the L2 interface (no shutdown/enable L2 interface command).
e. Exit the L2 interface configuration mode.

To configure an L3 connection/interface:
a. Select a type of interface (i.e., L3).
b. Enter L3 interface configuration mode.
c. Assign an Internet Protocol (IP) address, an L3 MTU, and an L3 QoS.
d. Enable the L3 interface (no shutdown/enable L3 interface command).
e. Exit the L3 interface configuration mode.

To configure a packet routing protocol (e.g., Intermediate System to Intermediate System (ISIS)):
a. Check for pre-requirements of the packet routing protocol:
   i. IP address configured on at least one interface.
   ii. IP routing process running for an address family (e.g., IPv4, IPv6).
b. Enter interface configuration mode for packet routing protocol.
c. Select a routing protocol (e.g., ISIS) and start a routing protocol process on the network device (e.g., router Routing Information Protocol (RIP), router Open Shortest Path First (OSPF)).
d. Assign interfaces to include routing advertisements (selects IP networks for the advertisements).
e. Assign an IP address, an L3 MTU, and an L3 QoS.
f. Exit the interface configuration mode.

To configure ECMP:
a. Identify parallel links or parallel multi-paths and associated network device interfaces for ECMP.
b. Enter ECMP configuration mode.
c. Enter interface or routing configuration mode
   i. Configure equal costs among interfaces identified in step (a) (e.g., configure Routing Information Base (RIB), Forwarding Information Base (FIB) accordingly).
d. Exit the ECMP configuration mode.

To configure traffic shaping as its own subservice or as a sub-component of another subservice, e.g., an interface:
a. Identify classes of network traffic (e.g., policy-map/class-map).
b. Define shaping, specifying peak/average of traffic, and bursting profile.
c. Enter interface (or permanent virtual circuit (PVC)) configuration mode.
d. Applying the above-defined shaping to an interface.
e. Exit interface configuration.

The subservices and operations to configure the subservices listed above are provided by way of example, only, and may be modified and/or expanded to include additional subservices and operations, as would be appreciated by one of ordinary skill in the relevant arts having read the present specification.

Assurance Orchestrator

Returning to FIG. 1A, assurance orchestrator 106 operates as a central controller for assurance of the services deployed on service network 113. That is, assurance orchestrator 106 employs "service awareness" to control assurance for the services deployed on service network 113. In this role, assurance orchestrator 106 performs several main operations. First, assurance orchestrator 106 generates, from the service type and the service instance in the definition of each service defined in service configuration information 116, a unique service tag for the service. In an example, the service tag for a given service may be a tuple that includes the service type and the service instance from the definition of the given service. The service tag may be used to distinguish the service to which it pertains from all other services.

Second, assurance orchestrator 106 decomposes the definition of each service defined in service configuration information 116 into a respective subservice dependency graph of subservices and dependencies/interdependencies between the subservices that collectively (actually) implement the service on a network. That is, assurance orchestrator 106 dissects each service into the respective subservice dependency graph. The subservice dependency graph includes (subservice) nodes that represent the subservices and links between the nodes that represent the dependencies between the subservices. The subservice dependency graph may include the service type and the service instance (e.g., the service tag) for the service represented by the subservice dependency graph. To assist with the aforementioned decomposition, assurance orchestrator 106 may poll or query various network devices identified in the definition to discover subservices, such as packet routing protocols, implemented on the network devices and that are to be incorporated into the subservice dependency graph.

In a non-limiting embodiment, the subservice dependency graph includes a subservice dependency tree having a root node that represents the services, and nodes that represent the subservices and that have parent-child relationships (i.e., the dependencies) between the nodes/subservices that lead back to the root node. An example of a subservice dependency tree is described below in connection with FIG. 6. Other types of graph constructs/data structures may be used to represent the subservice dependency graph, as would be appreciated by one of ordinary skill in the art having read the present specification.

Third, assurance orchestrator 106 derives from each subservice dependency graph a respective set of heuristic packages for the service described by the subservice dependency graph. The heuristic packages (i) specify/define service-related metrics (i.e., subservice metrics) to be monitored/recorded and reported by the subservices, and that are indicative of health statuses/states of the subservices, i.e., that are indicators of health states of the subservices, (ii) include rules to determine/compute key performance (KPIs) including the health states of the subservices (also referred to individually as a "subservice health state," and collectively as "subservice health states") based on the subservice metrics as recorded and reported, and (iii) which sensor paths (i.e., telemetry paths) are to be enabled for reporting telemetry, i.e., to report the subservice metrics recorded by the subservices from the subservices. The heuristic packages may also include or be associated with the service tag for the service to which the heuristic packages correspond. Assurance orchestrator 106 employs the heuristic packages to configure assurance agents 108 to monitor the subservices of the services, and to compute the health states of the subservices based on the monitoring, as described below.

Fourth, assurance orchestrator 106 provides to assurance agents 108 assurance agent configuration information 118 including the heuristic packages and their corresponding service tags in association with each other. Assurance orchestrator 106 may employ NETCONF to push the heuristic packages as YANG objects to assurance agents 108. Assurance orchestrator 106 may also provide the subservice dependency graphs to assurance collectors 110 in assurance collector configuration information 119.

Assurance Agents

Assurance agents 108 act as intermediary assurance devices between network devices 112, assurance collectors 110, and assurance orchestrator 106. More specifically, assurance agents 108 translate assurance agent configuration information 118, including the heuristic packages, to telemetry configuration information 120, and provide the telemetry configuration information to network devices 112, to configure the network devices 112 to record and report the subservice metrics mentioned above. For example, assurance agents 108 generate monitoring objects that define the subservice metrics to be recorded and reported by the subservices, and provide the monitoring objects to the subservices in telemetry configuration information 120, to configure the subservices to record and report the subservice metrics. Assurance agents 108 may maintain associations/bindings or mappings between the heuristic packages, the monitoring objects generated by the heuristic packages, and the services (e.g., service tags) to which the heuristic packages and the monitoring objects pertain. Assurance agents 108 may employ NETCONF (or RESTCONF), for example, to push YANG monitoring objects to network devices 112.

In response to receiving the monitoring objects in telemetry configuration information 120, network devices 112 record the subservice metrics specified in the monitoring objects, and report the subservice metrics (labeled as "metrics" 122 in FIG. 1A) back to assurance agents 108 in telemetry streams. In an example, the telemetry streams carry subservice metrics 122 in telemetry objects corresponding to the monitoring objects, as described below in connection with FIG. 2B. In turn, assurance agents 108 tag subservice metrics 122 with service tags to indicate which of the subservice metrics are associated with/belong to which of the services, to produce service-tagged subservice metrics 124 (labeled "tagged metrics" in FIG. 1A). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the subservice metrics.

In one embodiment, assurance agents 108 do not perform any specific analysis on the subservice metrics, leaving such analysis to assurance collectors 110 and/or assurance orchestrator 106. In another embodiment, assurance agents 108 perform analysis on subservice metrics 122 as instructed by the heuristic packages, to produce health states of the subservices (e.g., KPIs used as indicators of health states of the subservices) to which the subservice metrics pertain. Assurance agents 108 provide to assurance collectors 110 service-tagged subservice metrics 124, along with health states of the subservices when computed by the assurance agents. For example, assurance agents 108 provide flows of service-tagged subservice metrics tagged with service tag 1 to indicate service 1 to service 1 collector, and service-tagged subservice metrics tagged with service tag 2 to indicate service 2 to service 2 collector. Assurance agents 108 may also provide service-tagged subservice metrics 124 to assurance orchestrator 106.

Assurance Collectors

Assurance collectors 110 receive/collect service-tagged subservice metrics 124, and health states of the subservices when available, from assurance agents 108 for various services, as uniquely identified by the service tags with which the subservice metrics are tagged. Assurance collectors 110 associate service-tagged subservice metrics 124 with respective ones of the various services based on the service tags. Assurance collectors 110 determine a respective overall health state of each service based on the health states of the subservices of the service, as indicated by the service-tagged subservice metrics and their KPIs/health states. When assurance agents 108 do not provide to assurance collectors 110 health states of the subservices along with service-tagged subservice metrics 124, assurance collectors 110 compute the health states of the subservices from the service-tagged subservice metrics 124 as instructed by corresponding ones of the heuristic packages (e.g., by the heuristic packages tagged with the same service tag as the subservice metrics).

NETCONF/YANG (Object-Based) Implementation in Assurance System

Figure 2A:
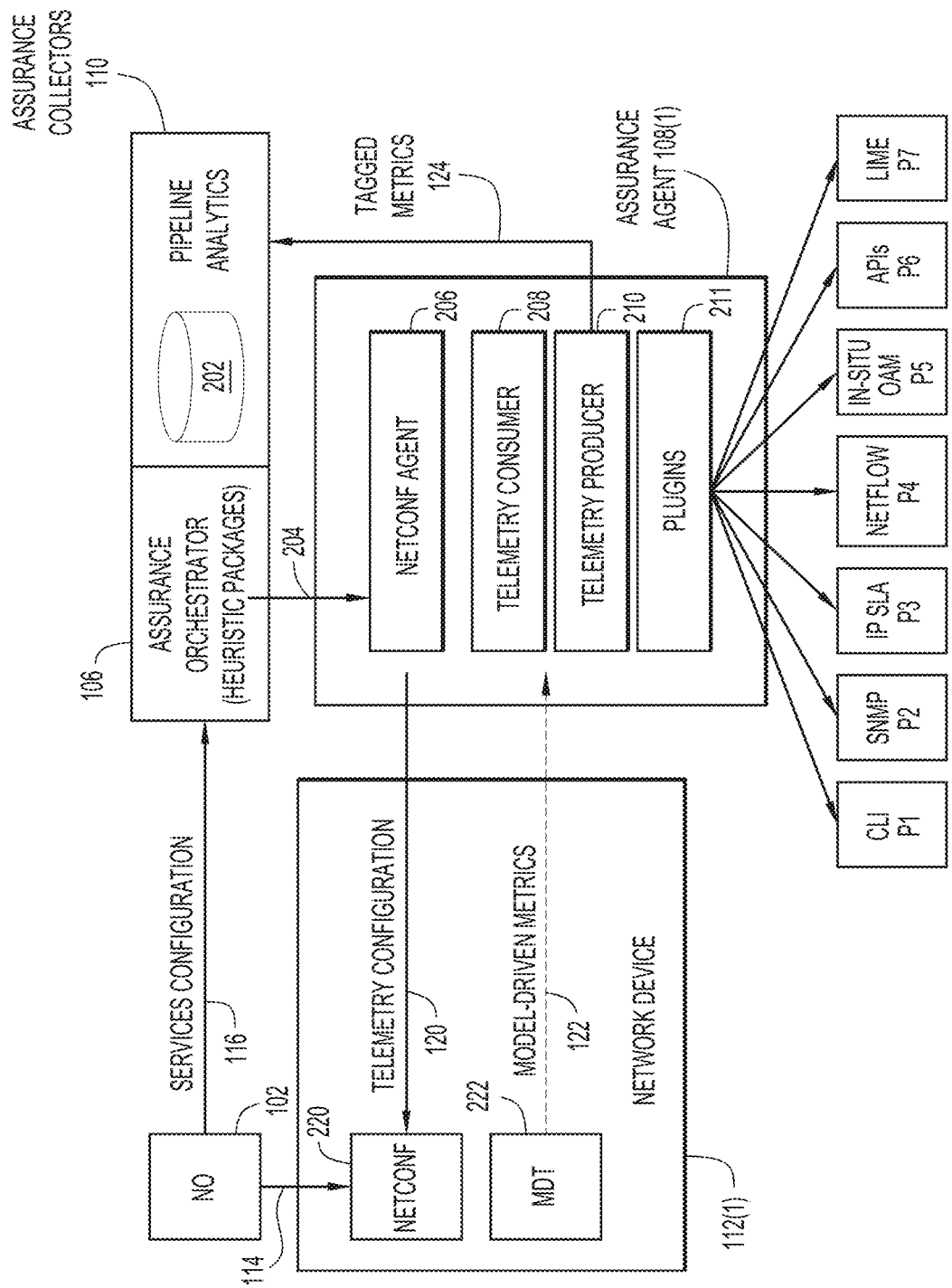
FIG. 2A is a block diagram that shows additional details of an assurance orchestrator, a representative assurance agent, and a representative network device of the service assurance system, according to an example embodiment.

With reference to FIG. 2A, there is a block diagram that shows additional details of assurance orchestrator 106, assurance collectors 110, a representative assurance agent (e.g., assurance agent 108(1)), and a representative network device (e.g., network device 112(1)) from FIG. 1A. Assurance collector 110 includes pipeline analytics 202 to analyze service-tagged subservice metrics 124 including the KPIs (if any) from assurance agents 108, to determine health states of the subservices and then service health states based on the health states of the subservices.

Assurance agent 108(1) includes a NETCONF agent 206, a telemetry consumer 208, a telemetry producer 210, and plugins 211. Plugins 211 provide various functional capabilities to assurance agent 108(1) to assist with tasks/operations performed by the assurance agent, including communicating with entities external to the assurance agent. Examples of plugins 211 include, but are not limited to, one or more of the following: a command line interface (CLI) plugin P1; a Simple Network Management Protocol (SNMP) plugin P2; an IP service-level agreement (SLA) plugin P3; a NetFlow™ protocol plugin to communicate with NetFlow-enabled network devices P4; an in-situ operations, administration, and maintenance (IOAM) plugin P5 to provide real-time telemetry of individual data packets and flows; application programming interfaces (APIs) P6; and Layer Independent OAM Management in the Multi-Layer Environment (LIME) P7.

NETCONF agent 206 digests heuristic packages 204 sent by assurance orchestrator 106. NETCONF agent 206 generates monitoring objects (in telemetry configuration information 120) as network device configuration YANG objects based on the heuristic packages, and pushes the monitoring objects to network device 112(1) to configure the network device for model-driven telemetry (MDT) used to report recorded subservice metrics. NETCONF agent 206 may include in the monitoring objects respective identifiers of the subservices to which the monitoring objects pertain (e.g., an identifier of network device 112(1), since the network device is a subservice), and the service tag for the service to which the subservice pertains. Telemetry consumer 208 receives from network device 112(1) subservice metrics 122 recorded in (model-driven) telemetry objects corresponding to the monitoring objects. The telemetry objects include the subservice metrics, the identifier of the subservice (e.g., the identifier of network device 112(1)) to which the subservice metrics pertain, and may also include the service tag copied from the corresponding monitoring object. Telemetry consumer 208 passes the (received) telemetry objects to telemetry producer 210. Telemetry producer 210 tags the (received) telemetry objects with service tags, as mentioned above, and sends resulting service-tagged telemetry objects (representing service-tagged subservice metrics 124) to assurance pipeline analytics 202 of assurance collectors 110, and optionally to assurance orchestrator 106. Telemetry producer 210 may also copy into the service-tagged telemetry objects any KPIs/health states of subservices computed by assurance agent 108(1) in the embodiment in which the assurance agent computes that information.

Network device 112(1) includes a NETCONF agent 220 and an MDT producer 222. NETCONF agent 220 receives network device configuration information 114 from network orchestrator 102 and configures subservice(s) on network device 112(1) based on the network device configuration information. NETCONF agent 220 also receives the monitoring objects from NETCONF agent 206, and configures the network device, including MDT producer 222, based on the monitoring objects. MDT producer 222, records its local subservice metrics and its subservice identifier in telemetry objects as instructed by the monitoring objects, and may optionally include the corresponding service tags in the telemetry objects, and reports the telemetry objects to telemetry consumer 208.

Distributed Assurance System

Figure 2B:
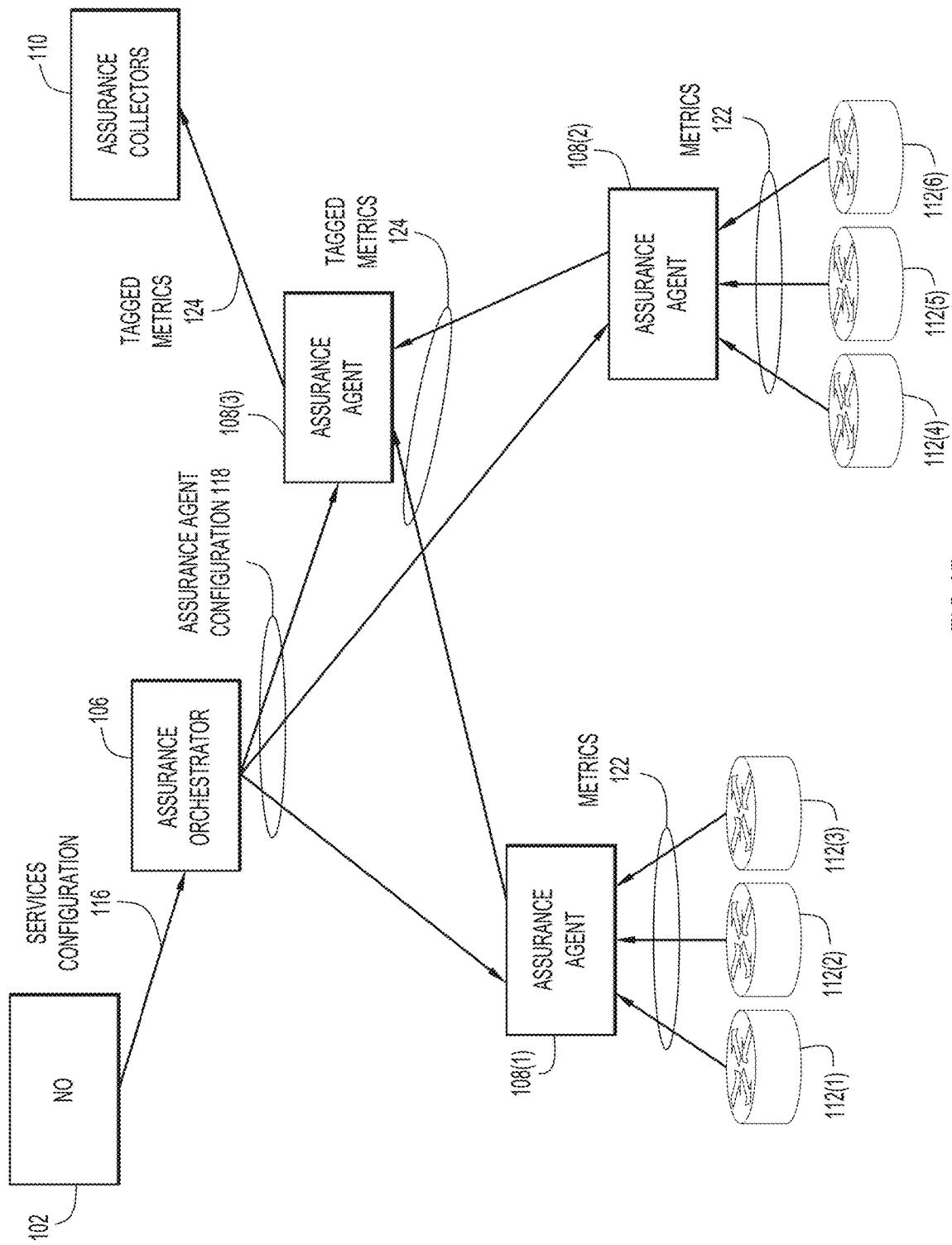
FIG. 2B is a block diagram that shows a distributed arrangement of assurance agents and network devices of the service assurance system, according to an example embodiment.

With reference to FIG. 2B there is a block diagram that shows an example of a distributed arrangement of assurance agents 108 and network devices 112 of service assurance system 100. In the example of FIG. 2B, assurance agent 108(1) is co-located with network devices 112(1)-112(3) at a first geographical location and assurance agent 108(2) is co-located with network devices 112(4)-112(6) at a second geographical location separated from the first geographical location. Service 1 (see FIG. 1A) may be implemented on network devices 112(1)-112(3), and Service 2 may be implemented on network devices 112(4)-112(6). Geographically distributed assurance agents 108(1) and 108(2) report their service-tagged telemetry objects to centralized assurance agent 108(3), which forwards the service-tagged subservice metrics to assurance collector 110.

Examples of service configuration information 116 for a service instance "xyz" (e.g., for a customer xyz) of service type L2 virtual private network (VPN) L2VPN, which is a peer-to-peer (p2p) connectivity type (i.e., L2VPN-p2p), are now described with reference to FIGS. 3-5. In FIGS. 3-5, the example service configuration information is represented as eXtensible Markup Language (XML) encoding of YANG models.

Service Configuration Information/Definition Examples

With reference to FIG. 3, there is an illustration of first example service configuration information 300 for a first network device and an interface of service instance xyz. More specifically, lines 302 introduce a "GigabitEthernet" interface for/on a first provider edge (PE) network device "sain-pe-1" (e.g., a router) for service instance xyz of type "l2vpn" indicated at line 304. As indicated at lines 302, first network device sain-pe-1 is running an XR operating system, by Cisco. Line 306 provides an identifier "0/0/0/3" for the GigabitEthernet interface. Line 308 defines a maximum transmission unit (MTU) for the interface. Groups of lines 310 and 312 define parameters for IPv4 and IPv6 addresses configured on the interface.

With reference to FIG. 4, there is an illustration of second example service configuration information 400 for a second network device of service instance xyz. More specifically, lines 402 introduce a second PE network device "sain-pe-2" (e.g., a router) for service instance xyz of type "l2vpn" indicated at line 406. Line 408 defines a QoS classification, as default, for traffic handled by the network device sain-pe-2. Alternatively, or additionally, service configuration information 400 may define a Quality-of-Experience (QoE) classification. Lines 410 define a policy rate for network device sain-pe-2.

With reference to FIG. 5, there is an illustration of third example service configuration information 500 for a first cross-connect ("xconnect") associated with second network device sain-pe-2 for service instance xyz. An "xconnect" is a L2 pseudowire (L2PW) used to create L2 VPNs (L2VPNs). Examples of xconnects are provided at https://www.amazon.com/Layer-VPN-Architectures-Networking-Technology-ebook/dp/B0051TM5BM, authored by C. Pignataro. In the present context of service assurance, "xconnect" refers to a syntax of a command used to realize the pseudowire in, for example, a Cisco internetwork operating system (IOS)-XR/IOS-XE operating system.

Lines 502 associate second network device sain-pe-2 with service instance xyz. Lines 504 define the first xconnect, which is associated with a GigabitEthernet subinterface 0/0/0/2.600 at line 506 and with an IPv4 address 192.168.0.17 at line 508.

Subservice Dependency Graph Example

Figure 6:
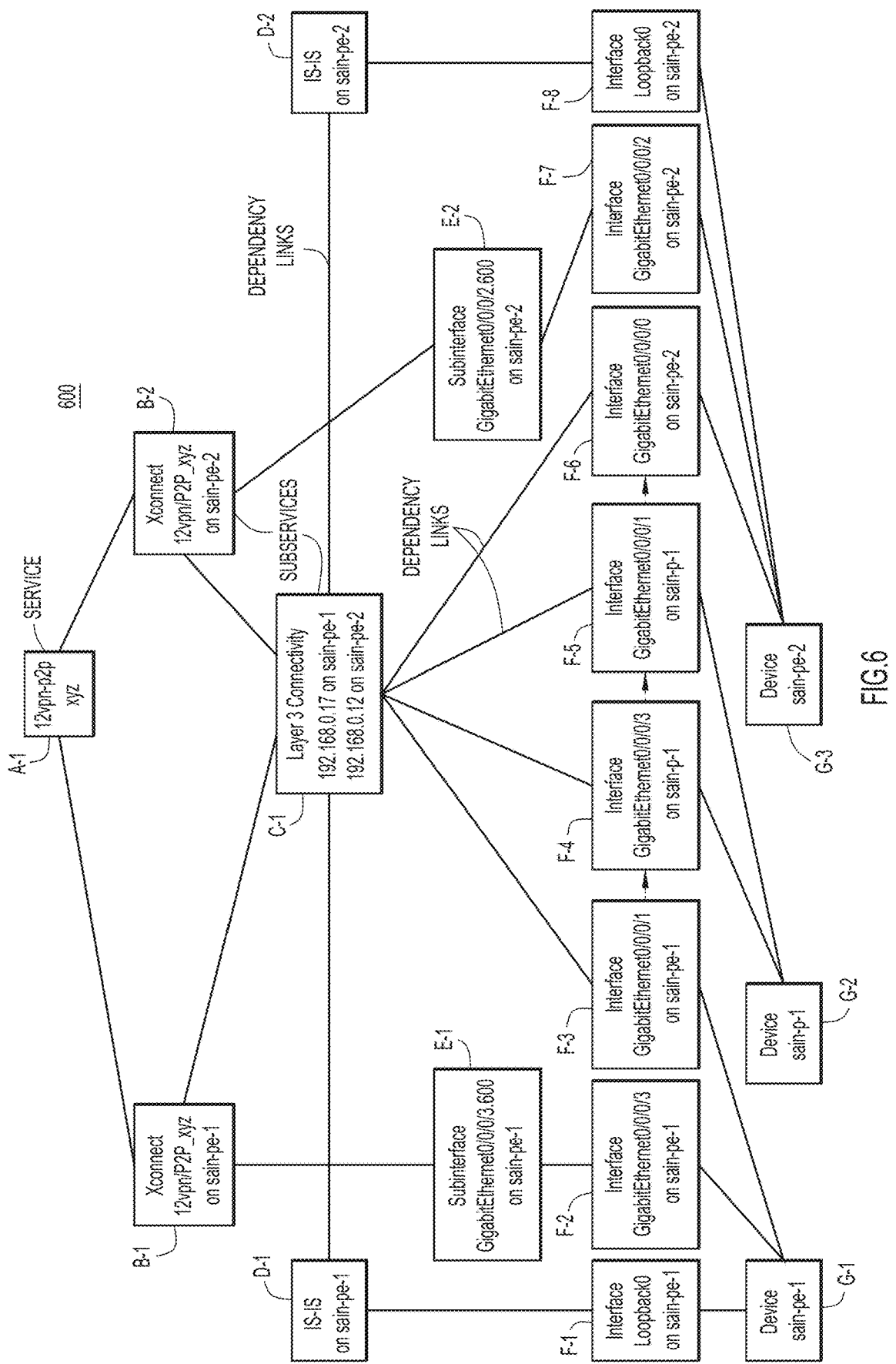
FIG. 6 is an illustration of a subservice dependency graph, in an example form of a subservice dependency tree, for a service, according to an example embodiment.

With reference to FIG. 6, there is an illustration of an example subservice dependency graph in the form of a subservice dependency tree 600 for service L2VPN-p2p, meaning an L2 VPN for a peer-to-peer connection. Subservice dependency tree 600 (or "tree" for short) includes a service node A-1 at a highest level of the tree. Service node A-1 identifies/represents the service by a service tag tuple that includes service type and service instance, e.g., tuple <service type, service instance>. In the example of FIG. 6, service node A-1 represents service <L2VPN-p2p, xyz>. Lower levels of tree 600 are populated with subservice nodes (shown as boxes) that identify/represent respective subservices of the service <L2VPN-p2p, xyz>, and that connect back to service node A-1 through subservice dependencies or parent-child links (shown as lines connecting boxes that depend on each other). Each of the subservice nodes includes an identifier (e.g., a plain text identifier, as depicted in FIG. 6) of the subservice represented by that subservice nodes. In the example of FIG. 6, the lower levels of tree 600 include:

a. A second level that includes subservice nodes B-1 and B-2 for xconnect subservices implemented on network devices sain-pe-1 and sain-pe2;

b. A third level that includes a subservice node C-1 for an L3 network connectivity subservice with components on network devices sain-pe-1 and sain-pe2.

c. A fourth level that includes subservice nodes D-1 and D-2 for routing protocol subservices (e.g., Intermediate System to Intermediate System (IS-IS)) on network devices sain-pe-1 and sain-pe-2.

d. A fifth level that includes subservice nodes E-1 and E-2 for subinterface subservices on network devices sain-pe-1 and sain-pe-2.

e. A sixth level that includes subservice nodes F-1-F-8 for interface subservices on network devices sain-pe-1 or sain-pe-2, as indicated.

f. A seventh level that includes subservice nodes G-1-G3 for network devices sain-pe-1 and sain-pe-2 as subservices as indicated.

In one example branch of subservice dependency tree 600, service <L2VPN-p2p, xyz> depends on the subservice of subservice node B-1, which depends on the subservice of subservice node E-1, which depends on the subservice of subservice node F-2, and so on down the levels of the tree. As indicated by the subservice links, a given subservice may depend on multiple other subservices. Traversing the levels of tree 600 downward from the highest level to the lowest level of the tree, the subservices of service <L2VPN-p2p, xyz> include network xconnects on network devices (e.g., on sain-pe-1 and sain-pe-2), L3 network connectivity on the network devices (L2 network connectivity on the network devices may also be a subservice), routing protocols on the network devices, interfaces of the network devices, subinterfaces of the network devices, and the network devices themselves.

Generally, the subservices include: xconnects on network devices; L1 (e.g., optical), L2, and L3 network connectivity on the network devices; routing protocols on the network devices; interfaces of the network devices; subinterfaces of the network devices; communication behavior of the interfaces and the subinterfaces; the network devices themselves and operations performed on/by the network devices. Subservices also include logical network functions and groupings of logical and physical elements, such as: ECMP/ECMP groups of network devices; network tunnels; link protection functions executing in a network; network device protection functions executing in a network; and logical overlays on a physical network.

Logical overlays may include: link aggregation for a link aggregation group (LAG); Virtual Extensible (Vx) LAN (VxLAN); VxLAN-Generic Protocol Extension (GPE); Generic Routing Encapsulation (GRE); service function chaining (SFC) functionality including Network Service Header (NSH) implementation; and Multiprotocol Label Switching (MPLS); for example. The subservices may also include applications such as application categorization as per RFC 6759. The subservices may also include one or more multicast subnets on network devices.

Heuristic Packages

Examples heuristic packages are now described in connection with FIGS. 7-9.

Figure 7:
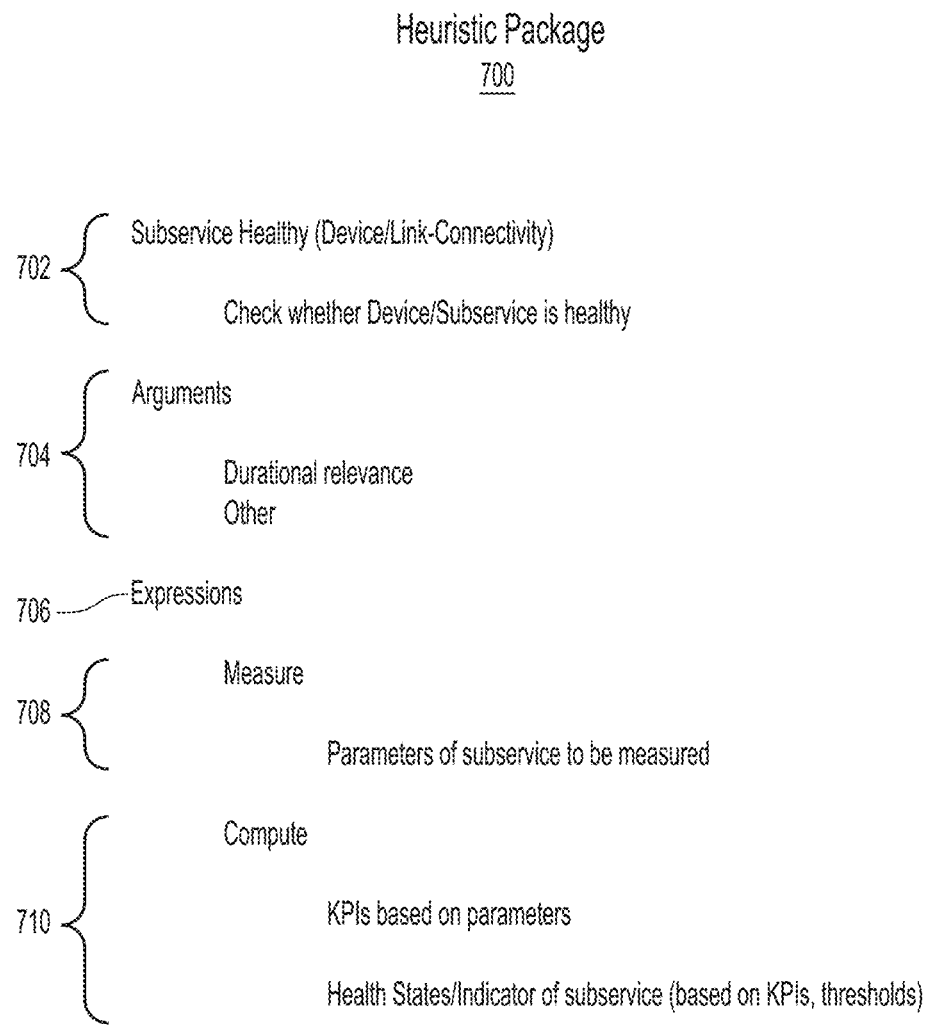
FIG. 7 is an illustration of a generalized heuristic package generated based on a subservice dependency graph, according to an example embodiment.

With reference to FIG. 7, there is an illustration of an example generalized heuristic package 700 generated based on a subservice dependency graph. Heuristic package 700 includes a header 702 that identifies a subservice of the subservice dependency graph that is targeted by the heuristic package, and an overall function for which the heuristic package is to be used. For example, header 702 may identify any specific one of xconnect, L3 connectivity, routing protocol, subinterface, interface, or network device, and the header may specify that the heuristic package is to be used to determine a health of the indicated subservice.

Heuristic package 700 may include arguments 704, which indicate various conditions under which the heuristic package is to be used, such as a time duration over which the subservice is to be monitored. Heuristic package 700 also includes expressions 706, which include measure 708 and compute 710. Measure 708 specifies subservice metrics of the subservice that are to be recorded. For example, for a network device subservice, the subservice metrics may include central processor unit (CPU) usage, free memory, temperature, power, and the like. For an interface of the network device, the subservice metrics may include traffic rate, and so on. Compute 710 provides rules and/or instructions to compute KPIs based on the subservice metrics, and instructions to determine a health state for the subservice, such as thresholds against which computed values are to be compared to determine the health state.

Compute 710 may include rules to compute a health state that is binary, i.e., a health state that indicates either a passing health state when the subservice is operating properly (e.g., meets a desired performance level) or a failing health state (which is a degraded health state) when the subservice is not operating properly (e.g., does not meet the desired performance level). Alternatively, the rules may compute a health state that is graded, i.e., a health state that indicates a health state within a range of possible health states from passing to failing, e.g., including a passing health state, a failing health state, and a degraded health state that is not a passing health state or a failing health state (in this case, degraded means between passing and failing). In an example, the health states may include the following computed health state values: failing=0, 0<degraded<1, passing=1.

Figure 8:
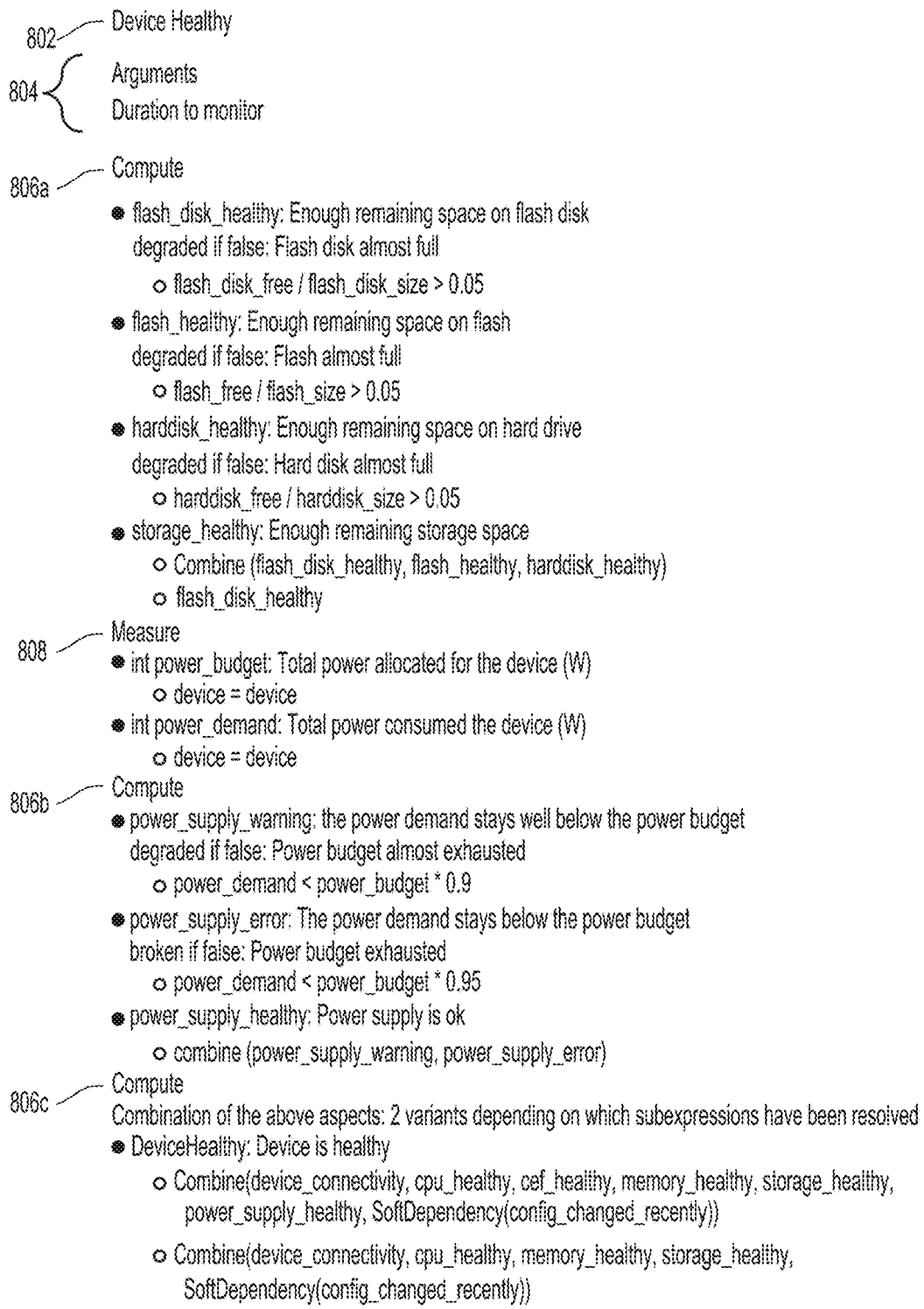
FIG. 8 is an illustration of a heuristic package for a network device used by a service, according to an example embodiment.

With reference to FIG. 8, there is an illustration of an example heuristic package 800 for a network device subservice. Heuristic package 800 includes header 802 and arguments 804. Heuristic package 800 includes compute 806*a* to compute health indicators (KPIs) for a flash disk, flash, a hard disk, and storage, generally. For example, compute 806*a* includes rules to set the health state to indicate a degraded health state if memory of a flash disk is full, and further rules to evaluate the following Boolean operation: flash_disk_free/flash_disk_size>0.05, and so on. Heuristic package 800 includes measure 808 that lists power metrics to be measured (e.g., power demand), and compute 806*b* to compute health states based on the power metrics. Heuristic package 800 also includes compute 806*c* to compute an overall health state (KPI) for the network device based on values computed in prior computes 806*a* and 806*b*. That is, compute 806*c* defines a rule expression to evaluate the overall health state of the subservice based on the subservice metrics and the computed (intermediate) values mentioned above.

With reference to FIG. 9, there is an illustration of an example heuristic package 900 for a network protocol (e.g., IS-IS) subservice implemented on a network device. Heuristic package 900 includes header 902 and arguments 904. Heuristic package 900 includes measure 906 to measure metrics associated with IS-IS, including to determine lists of valid IPv4 and IPv6 IS-IS routes on the network device (e.g., from a forwarding or routing table in the network device). Heuristic package 900 includes compute 908 to compute KPIs that include various counts and stabilities of the IPv4 and the IPv6 IS-IS routes based on the metrics from measure 906, and to compute an overall health state 910, which is also a KPI, for IS-IS based on previously computed values/KPIs.

Assurance Collector Operations and User Interfaces

Further operations of assurance collectors 110 are now described in connection with FIGS. 10 and 11, and with reference again to FIG. 1A. As mentioned above, assurance collectors 110 receive/collect service-tagged subservice metrics 124 from assurance agents 108 for various services, subservice dependency graphs for the various services, and heuristic packages for the various services. The subservice dependency graphs each includes the service tag for the service to which the subservice dependency graph pertains. The heuristic packages each includes the service tag to which the heuristic package pertains. Assurance collectors 110 associate all service-tagged subservice metrics 124 (and health states of subservices when available) tagged with a given service tag to the subservice dependency graphs that includes the given service tag, and to the heuristic packages that include the given service tag. In other words, assurance collectors 110 associate all service-tagged metrics 124 (and health states of subservices), subservice dependency graphs, and heuristic packages that have a matching (i.e., the same) service tag to each other and to the service identified by that service tag.

For each service, assurance collectors 110 may populate the subservice dependency graph with corresponding health states of the subservices of the subservice dependency graph as represented by the service-tagged subservice metrics. For example, assurance collectors 110 may populate the nodes of a subservice dependency tree for the service with the health states of the subservices represented by the nodes. In an embodiment in which assurance agents 108 provide the health states of the subservices along with the service-tagged subservice metrics to assurance collectors 110, the assurance collectors may populate the subservice dependency tree with the provided health states. Alternatively, assurance collector 110 computes the health states of the subservices from the corresponding service-tagged metrics 124 in accordance with the corresponding heuristic packages, and then populates the subservice dependency tree with the health states as computed.

The resulting subservice dependency graph, populated with health states of the subservices, may be generated for display to an administrator in a graph form (e.g., tree) or otherwise, e.g., as a list of subservices for the service. Also, for each service, assurance collectors 110 may determine an overall health state of the service (also referred to simply as a "health state" of the service) based on the health states of the subservices of the service. For example, if all of the subservices have health states that indicate passing health states, assurance collectors 110 may set the overall health state to indicate a passing overall health state. Alternatively, if the health states of one or more of the subservices indicate failing health states, assurance collectors 110 may set the overall health state to indicate a failing overall health state.

Figure 10:
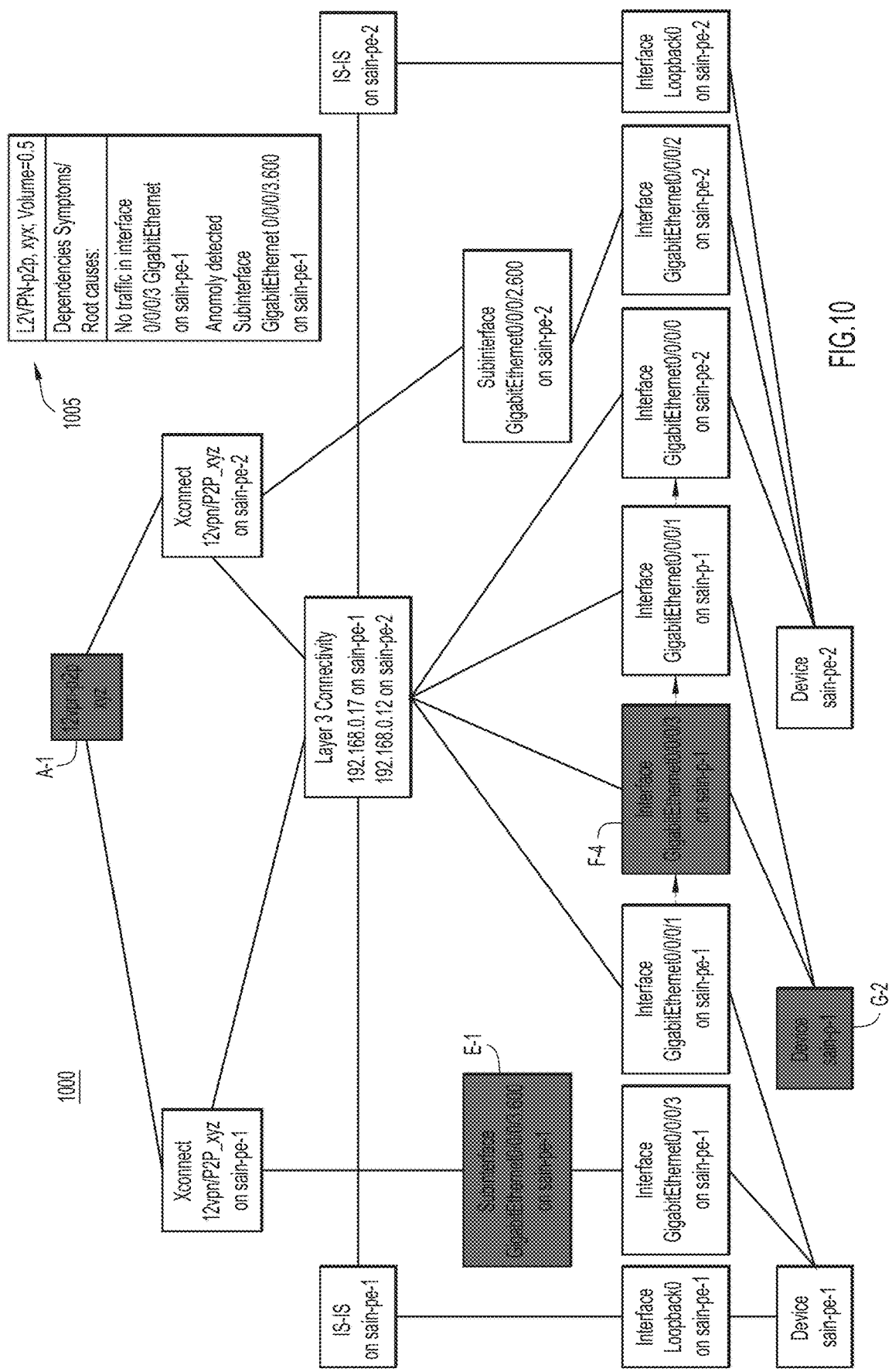
FIG. 10 is an illustration of a user interface (UI) generated for display by assurance collectors of the service assurance system based on an analysis of service-tagged subservice metrics belonging to a specific service, according to an example embodiment.

With reference to FIG. 10, there is an illustration of an example user interface (UI) 1000 generated for display by assurance collectors 110 responsive to collecting and analyzing service-tagged subservice metrics for the service L2VPN-p2p, xyz. UI 1000 includes subservice dependency tree 600 for the service, as described above, but with various subservices highlighted (e.g., with shaded) to indicate degraded health states (which may mean a failing health state or, alternatively, a degraded health state between failing and passing). Specifically, UI 1000 includes shading of subservices identified by subservice nodes E-1, F-4, and G-2, which indicates degraded health states for those subservices, i.e., assurance collectors 110 determined degraded health states of those subservices. Moreover, UI 1000 includes shading of the service L2VPN-p2p, xyz identified by service node A-1, which indicates a degraded overall health state of the service, i.e., assurance collectors 110 determined the degraded overall health state of the service based on the degraded health states of its subservices. In other example, different colors may distinguish passing health states (e.g., green) and degraded health states (e.g., orange).

UI 1000 also includes an information window or panel 1005 that provides health states and diagnostic information for the degraded subservices and the service.

Figure 11:
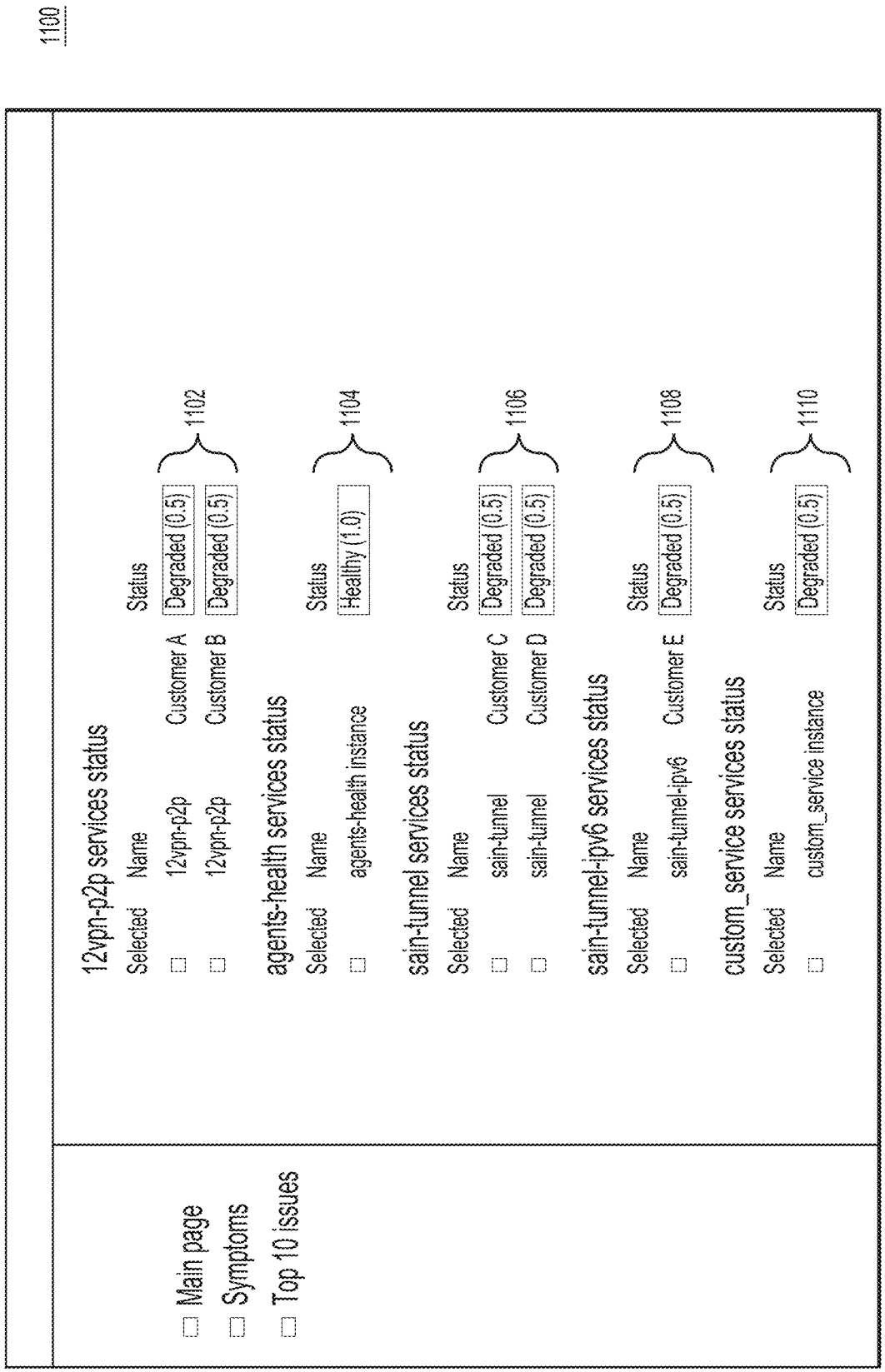
FIG. 11 is an illustration of UI generated for display by the assurance collectors based on an analysis of service-tagged subservice metrics for multiple services, according to an example embodiment.

With reference to FIG. 11, there is an there is an illustration of an example user interface (UI) 1100 generated for display by assurance collectors 110 responsive to collecting and analyzing service-tagged subservice metrics for multiple services. UI 1100 includes a panel 1102 that shows health states for two L1VPN-p2p services including service instances Customer A and Customer B, both degraded. UI 1100 includes a panel 1104 that shows health states for assurance agents 108. UI 1100 also includes a panel 1106 that indicates health states for Customer C and Customer D tunnel services, a panel 1108 that indicates a health state for a Customer E IPv6 service, and a panel 1110 that indicates a health state for a customer service.

Monitoring and Service-Tagged Telemetry Objects

Figure 12:
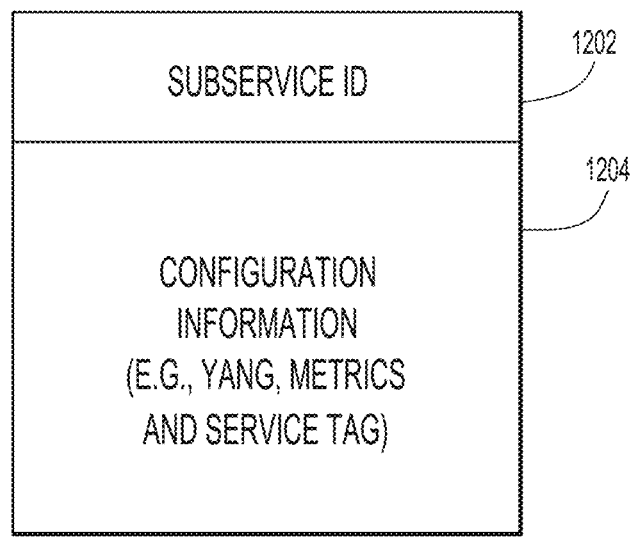
FIG. 12 is an illustration of a monitoring object used to configure a subservice of a service, according to an example embodiment.

With reference to FIG. 12, there is an illustration of an example monitoring object 1200. Monitoring object 1200 includes a subservice identifier (ID) 1202 and configuration information 1204. Configuration information 1204 may include YANG network device configuration information, for example, and identifies subservice metrics to be recorded and reported, in accordance with a heuristic package. Configuration information 1204 may include one or more configuration code snippets to configure a subservice, e.g., a network device, to perform the recording/reporting of the subservice metrics. For example, a heuristic package with instructions to monitor (memory) "space available" for MPLS in a network device running IOS-XR may result in the following command line interface (CLI) code snippet in a monitoring object destined for the network device:

```
CLIMetric:
    Command: show resource detail,
    regex_type: textfsm,
    regex: ios_xr/show_oef_rsource_detail.txt,
    key: "space available"
    filter:
        "node"
        "mpls"
post_processing: convert2byte (GetTuple (value, 0), GetTuple (value, 1)
```

Alternatively, the monitoring object may include a YANG object that performs the same function as the CLI code snippet. Alternative, the monitoring object may include binary information such as a packet.

Monitoring object 1200 may also include a service tag for the service to which the subservice identified by the subservice ID pertains.

Figure 13:
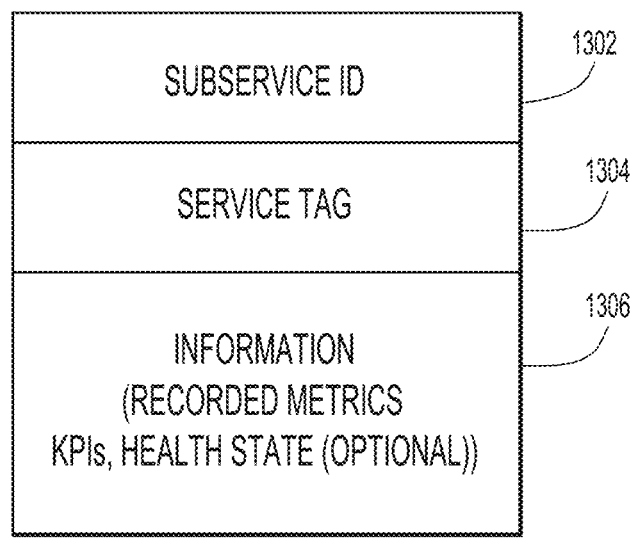
FIG. 13 is an illustration of a service-tagged subservice metrics in a form of a telemetry object corresponding to the monitoring object, according to an example embodiment.

With reference to FIG. 13, there is an illustration of an example service-tagged telemetry object 1300. Service-tagged telemetry object 1300 includes a subservice identifier 1302, a service tag 1304, and information 1306. Information 1306 includes recorded/reported subservice metrics, computed values, and KPIs (including a health state of a subservice) in accordance with a heuristic package from which a corresponding monitoring object was generated.

Service Assurance Operational Flow

Figure 14:
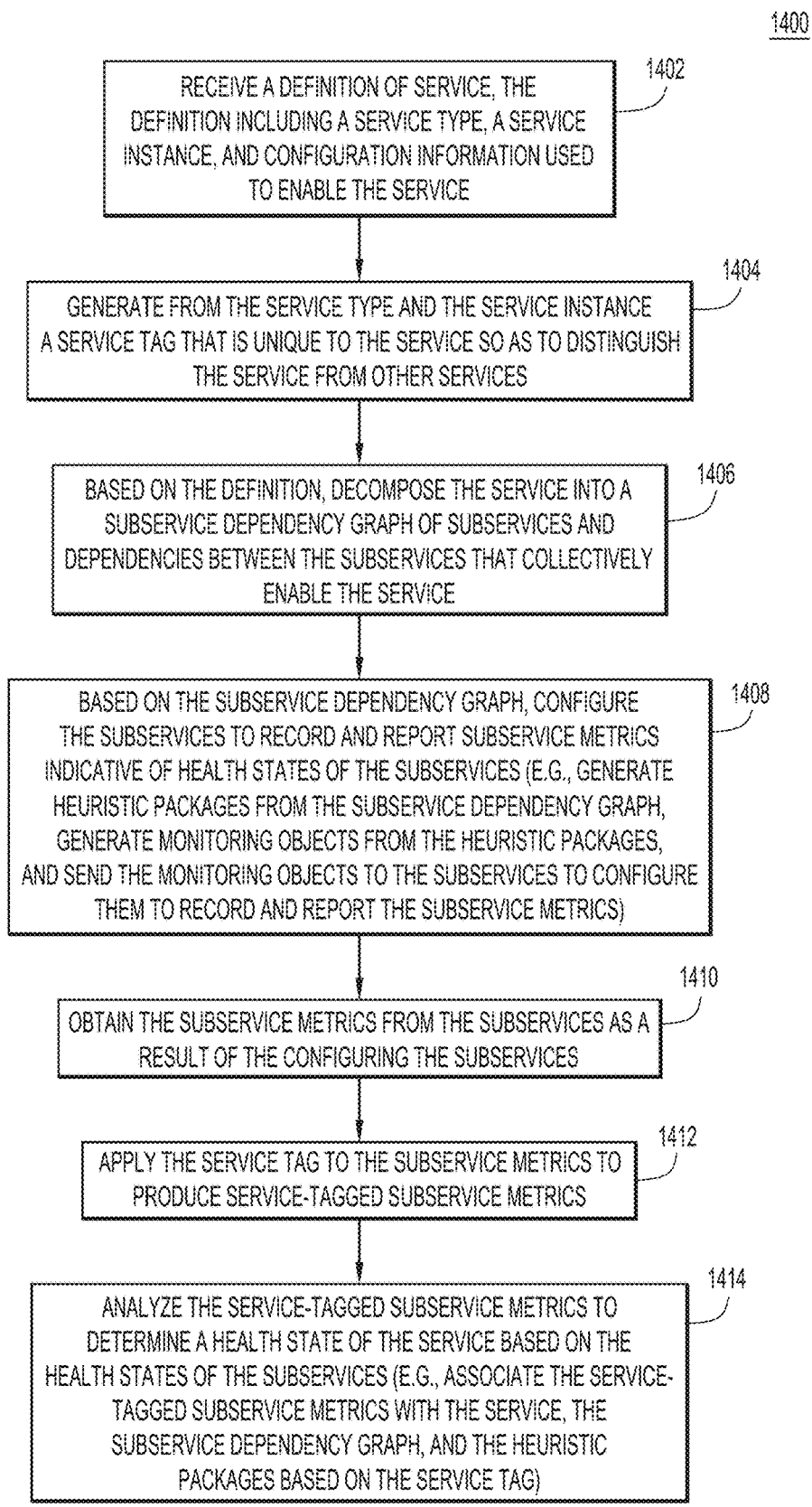
FIG. 14 is a flowchart of a method of performing assurance for a service enabled on a network, according to an example embodiment.

With reference to FIG. 14, there is a flowchart of an example method 1400 of performing assurance for a service enabled on a network. Method 1400 may be performed by a system including one or more entities to provide assurance for the service on the network. The one or more entities may include one or more of assurance orchestrator 106, assurance agents 108, and assurance collectors 110.

At 1402, a definition of a configuration of a service is received, e.g., by assurance orchestrator 106. The definition includes a service type, a service instance, and configuration information used to enable or implement the service in the network.

At 1404, a service tag is generated from the service type and the service instance. For example, assurance orchestrator 106 generates the service tag. The service tag identifies the specific instantiation of the service in the network, and is unique so as to distinguish the service from other services. The service tag may be a tuple that includes the service type and the service instance.

At 1406, based on the configuration information of the definition, the service is decomposed into a graph of subservices and dependencies between the subservices that collectively actually implement the service in the network. The service tag is applied to the subservice dependency graph. For example, assurance orchestrator 106 decomposes the service into the subservice dependency graph, and may provide the subservice dependency graph to assurance collectors 110.

At 1408, the subservices are configured to record and report subservice metrics indicative of health states of the subservices (e.g., a respective health state of each of the subservices) based on the subservice dependency graph. The health states may respectively indicate either a passing health state or a failing health state. Alternatively, the health states may respectively indicate a health state within a range of health states including a passing health state, a failing health state, and a degraded health state that is not a passing health state or a failing health state. Operation 1408 may include the following further operations:

a. Based on the subservice dependency graph, assurance orchestrator 106 generates heuristic packages, typically one per subservice, that specify the subservice metrics that the subservices are to record and report, and include rules to compute the health states of the subservices based on the subservice metrics. Assurance orchestrator 106 provides to assurance agents 108 the heuristic packages and the service tag.
  b. Responsive to the heuristic packages, assurance agents 108 generate from the heuristic packages monitoring objects that define the subservice metrics that the subservices are to record and report, and provide the monitoring objects to the subservices to configure the subservices to record and report the subservice metrics.

At 1410, responsive to the configuring of 1408, the subservice metrics are obtained from the subservices. For example, responsive to the monitoring objects, the subservices record and then report to assurance agents 108 the subservice metrics in telemetry objects corresponding to the monitoring objects.

At 1412, the service tag is applied to the subservice metrics to produce service-tagged subservice metrics. For example, assurance agents 108 receive the telemetry objects, insert the service tag into the telemetry objects, and then send the (resulting) service-tagged telemetry objects to assurance collectors 110. Optionally, assurance agents 108 also analyze the subservice metrics to compute health states of the subservices in accordance with the rules in the heuristic packages, and insert the health states into the service-tagged telemetry objects before sending them to assurance collectors 110, which receive the service-tagged telemetry objects.

At 1414, the service-tagged subservice metrics are analyzed to determine a health state of the service. For example, assurance collectors 110 (i) associate the subservice metrics in the service-tagged telemetry objects with the service based of the service-tagged telemetry objects, (ii) analyze the subservice metrics to compute individual health states of the subservices (unless the health states are included with the service-tagged telemetry objects), e.g., one health state per subservice, based on the rules in the heuristic packages, and (iii) determine an overall health state of the service based on the individual health states of the subservices, which were associated with the service based on the service tags at (i). For example, if all of the health states of the subservices indicate passing health states, the overall health state may be set to indicate a passing overall health state. Alternatively, if one or more of the health states of the subservices indicate failing health states, the overall health state may be set to indicate a failing overall health state. Alternatively, if one or more of the health states of the subservices indicate degraded (not failing or passing) health states, and there are no failing health states, the overall health state may be set to indicate a degraded (not failing or passing) overall health state.

In addition, assurance collectors 110 populate indications of the subservices in the subservice dependency graph with their respective health states, and generate for display the populated subservice dependency graph to provide visual feedback. In various embodiments, operations performed by assurance collectors 110 as described above may be shared between the assurance collectors and assurance orchestrator 106. In another embodiment in which assurance collectors 110 are omitted, assurance agents 108 send service-tagged subservice metrics (and health states) directly to assurance orchestrator 106, and the assurance orchestrator performs all of the operations performed by the assurance collectors as described above. That is, assurance orchestrator 106 operates as the assurance orchestrator and assurance collectors 110.

In an environment that includes multiple services, method 1400 is performed for each service, by the one or more entities, to produce, for each service, respectively, a unique service tag, a subservice dependency graph, heuristic packages, monitoring objects, telemetry objects, tagged telemetry objects, health states of subservices, and an overall service health state. The one or more entities use the unique service tags to distinguish between the services and the aforementioned information generated for the services.

Closed Loop Automation for Intent-Based Networking

Closed loop automation for intent-based networking is now described. Closed loop automation for intent-based networking discovers an overall health state of a service comprising a collection of subservices based on health states of the subservices, using techniques described above, for example. If the closed loop automation discovers that the overall health state of the service (also referred to as the "service health state") indicates a failing overall health state, the closed loop automation reconfigures the subservices so that the overall health state indicates a passing overall health state. In other words, the closed loop automation provides feedback to "close the loop" in service assurance system 100 to restore the overall health state of the service to an acceptable, passing overall health state.

Figure 15:
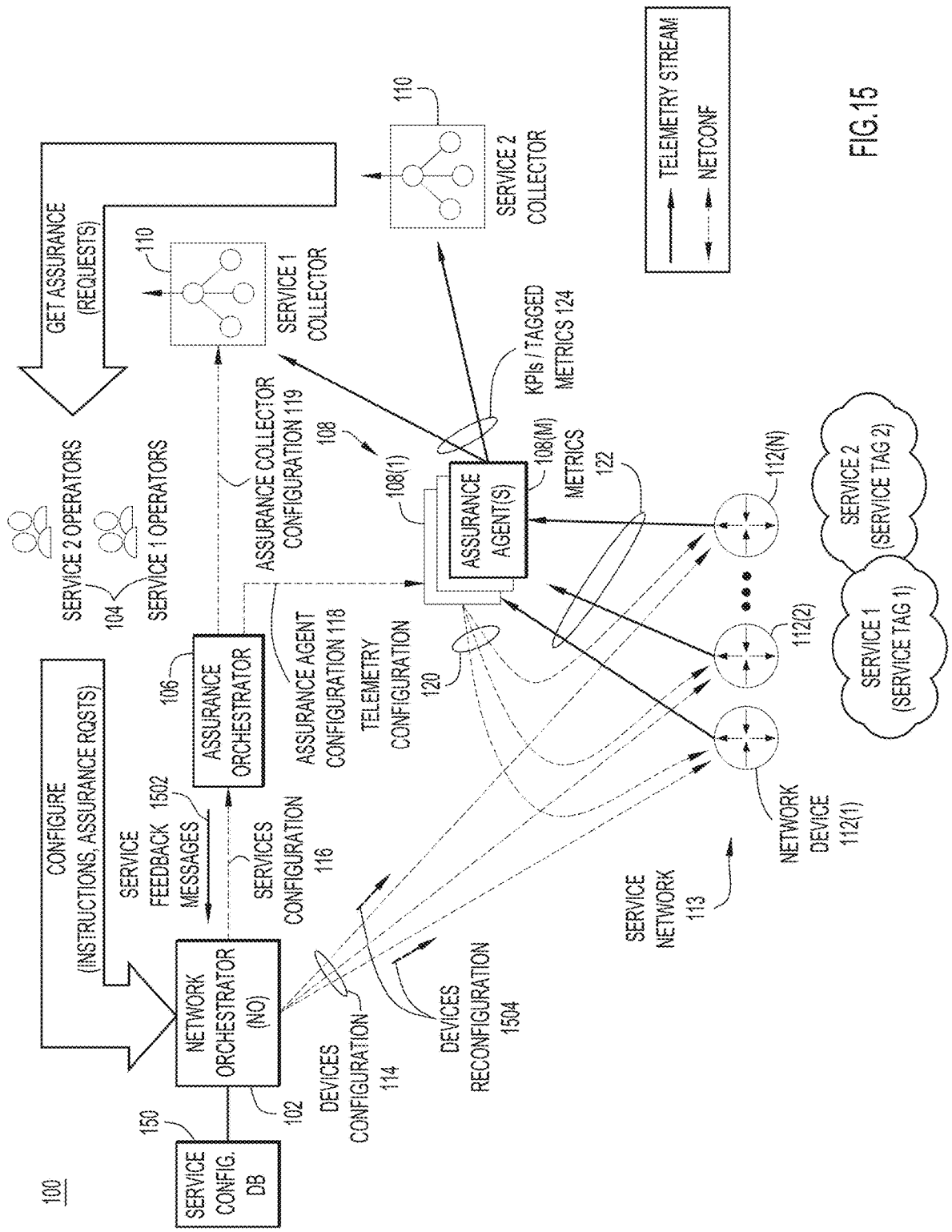
FIG. 15 is a block diagram of the service assurance system adapted to perform closed loop automation for intent-based networking, according to an example embodiment.

With reference to FIG. 15, there is shown a block diagram of service assurance system 100 adapted to perform the closed loop automation. FIG. 15 is similar to FIG. 1A, except that FIG. 15 shows additional flows used for the closed loop automation. For closed loop automation, assurance orchestrator 106 determines an overall health state of each of the services implemented on service network 113, and then provides to network orchestrator 102 service assurance messages 1502 (also referred to as "flow 1502"). Service assurance messages 1502 include the overall health states for the services as determined by assurance orchestrator 106, and may also include health states of subservices for each of the services. Service assurance messages 1502 may also include, for each of the services having an overall health state that indicates a failing (or degraded) overall health state, a corresponding request to reconfigure subservices of that service, so as to return the overall health state to a passing overall health state. The request to reconfigure may also be referred to as a "subservice reconfiguration request."

Responsive to each request to reconfigure subservices of a service received in service assurance messages 1502, network orchestrator 102 reconfigures the subservices of the service, as identified in the request. To reconfigure the subservices, network orchestrator 102 provides subservice reconfiguration information 1504 (also referred to as "flow 1504") to the network devices among network devices 112 that host/implement the subservices to be reconfigured. Subservice reconfiguration information 1504 may be formatted similarly to network device configuration information 114, and may be provided to network devices 112 similarly to the way in which the network device configuration information is provided to the network devices.

Figure 16:
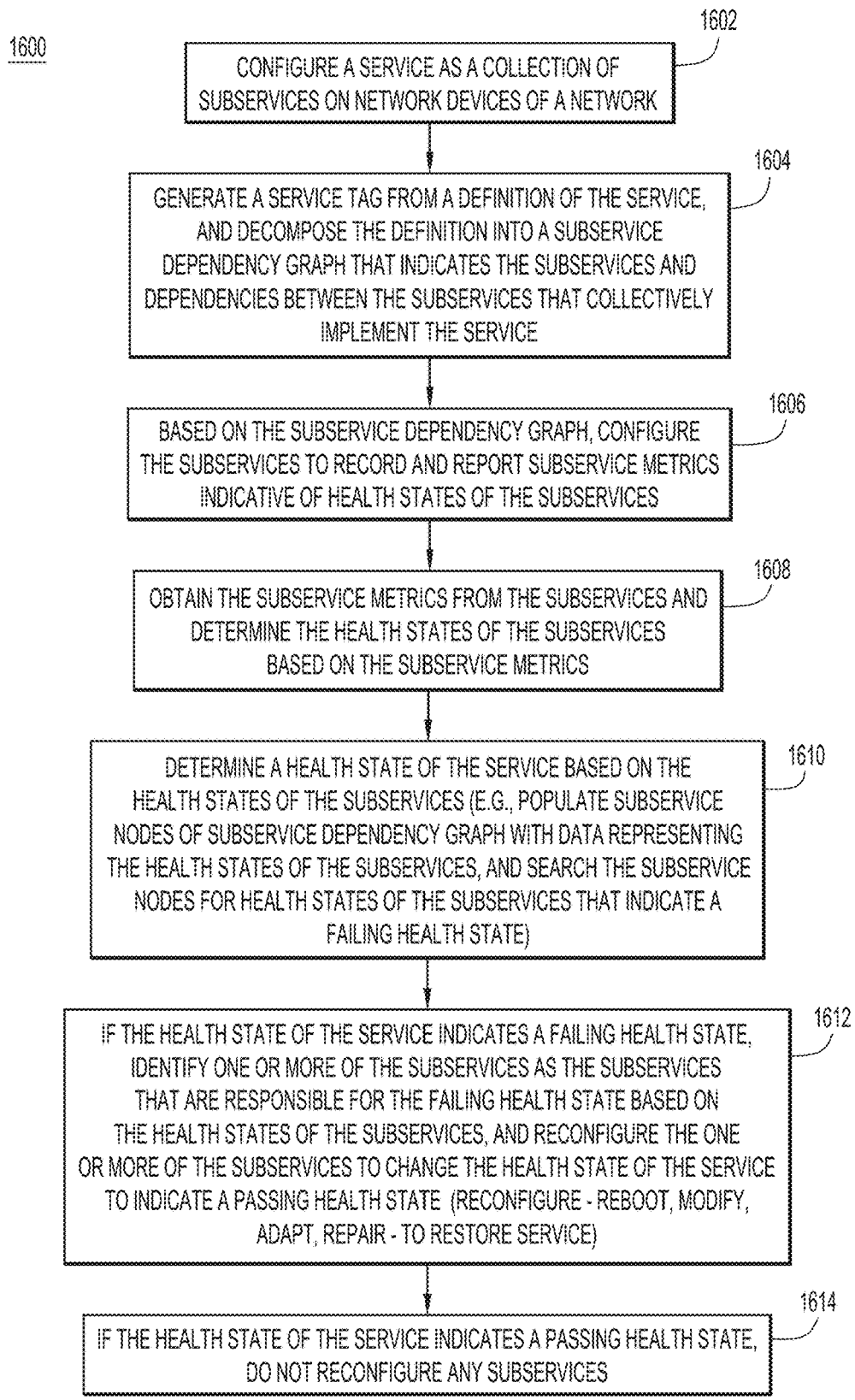
FIG. 16 is a flowchart of a method of closed loop automation for intent-based networking performed by the service assurance system of FIG. 15, according to an example embodiment.

With reference to FIG. 16, there is a flowchart of an example method 1600 of closed loop automation for intent-based networking performed in service assurance system 100, as depicted in FIG. 15, for example. Method 1600 incorporates various operations described above. The terms "health state of a subservice" and "subservice health state" are synonymous and interchangeable.

At 1602, network orchestrator 102 configures a service as a collection of subservices on network devices of a network, stores a definition of the service in service configuration database 150, and provides the definition to assurance orchestrator 106. The definition includes a service type, a service instance, and configuration information, as described above.

At 1604, assurance orchestrator 106 generates a service tag based on the definition of the service, and decomposes the definition into a subservice dependency graph that indicates the subservices and dependencies between the subservices that collectively implement the service. Operation 1604 may include operations 1402-1406 of method 1400.

At 1606, based on the subservice dependency graph, assurance orchestrator 106 and assurance agents 108, collectively, configure the subservices to record and report subservice metrics indicative of health states of the subservices. Operation 1606 may include operation 1408 of method 1400.

At 1608, assurance agents 108 and assurance orchestrator 106, collectively, obtain the subservice metrics from the subservices, tag the subservice metrics with the service tag, and determine the health states of the subservices based on the subservice metrics. Operation 1608 may include operations 1410, 1412, and 1414 of method 1400.

At 1610, assurance orchestrator 106 determines an overall health state of the service based on the health states of the subservices. In an example, assurance orchestrator 106 populates subservice nodes of the subservice dependency graph with data representing respective ones of the health states of the subservices, and searches the subservice nodes for any of the health states of the subservices that indicate a failing health state. Assurance orchestrator 106 may generate for display the subservice dependency graph populated with the data representing the health states of the subservices, as shown in FIG. 10, for example. Operation 1610 may include operation 1414 of method 1400.

At 1612, if the overall health state indicates a failing overall health state, assurance orchestrator 106 identifies one or more of the subservices as the subservices that are responsible for the failing overall health state based on the health states of the subservices. Assurance orchestrator 106 generates one or more service assurance messages that include (i) the identifier of the service (e.g., the service tag), (ii) the overall health state that indicates the failing overall health state, (iii) identifiers and health states of at least the one or more subservices that are responsible for the failing overall health state, and (iv) a request to reconfigure the one or more of the subservices. The one or more service assurance messages may report health states of all of the subservices, not just those of the one or more subservices responsible for the failing overall health state. Assurance orchestrator 106 provides the one or more service assurance messages to network orchestrator 102, as indicated in flow 1502 of FIG. 15.

Responsive to the one or more service assurance messages, including the request to reconfigure the one or more subservices, network orchestrator 102 reconfigures the one or more subservices. To do this, network orchestrator 102 (i) uses the identifier of the service and the identifiers of the one or more subservices from the one or service assurance messages as indexes to access/retrieve the subservice configuration information for the one or more subservices from the service definition stored in service configuration database 150, (ii) generates subservice reconfiguration information based on the subservice configuration information retrieved from the service definition, and (iii) provides the subservice reconfiguration information to network devices among network devices 112 that host/implement the one or more subservices, as indicated in flow 1504 of FIG. 15. In response to the subservice reconfiguration information, network devices 112 reconfigure the one or more subservices to implement the requested subservice reconfiguration, thus closing the loop for the closed loop automation process. The entire closed loop automation is performed without manual intervention.

Network orchestrator 102 may reconfigure the one or more subservices in many different ways to improve the overall health state of the service, e.g., to change the overall health state from failing to passing. In one example, network orchestrator 102 may simply repeat the operations used to configure the one or more subservices as performed at 1602, in which case the subservice reconfiguration information may include the same intent-based network device configuration objects that were used to initially configure the one or more subservices at 1602. For example, network orchestrator 102 may repeat the operations described above in connection with FIG. 1B to configure one or more of an L1 connection/interface, an L2 connection/interface, an L3 connection/interface, a packet routing protocol, ECMP, traffic shaping, and so on, as identified in the request to reconfigure.

In another example, network orchestrator 102 may reboot the one or more subservices. To reboot a subservice, network orchestrator 102 may first validate permissions and user authorizations for the subservice as provided in the service definition, force a process that implements the subservice to enter a privileged mode, and then reboot the process or an operating system that hosts the process. Alternatively, network orchestrator 102 may implement a process to perform a network device repair or link repair for critical network devices and/or links associated with the one or more subservices.

In yet another example, network orchestrator 102 may not completely reconfigure the one or more subservices, but rather may adjust/modify selected operational parameters of the one or more subservices (from their initially configured values) to improve their operational performance. This constitutes only a partial or limited reconfiguring of the one or more subservices. For example, for the one or more subservices, network orchestrator 102 may:
  a. Adjust routing metrics, such as cost routing.
  b. Modify L2 QoS, MTU, or adjust storm control policies (L2).
  c. Change optical transmission power or hardcode interface speed (L1).
  d. Adjust L3 QoS or MTU (L3).
  e. Change ECMP hashing inputs (e.g., use destination IP instead of source IP).
  f. Perform traffic shaping by modifying QoS to assure a desired level of traffic throughput.
  g. Adjust interface traffic throughput (e.g., bandwidth).

In even further examples, service assurance system 100 may reprogram the level of detail and frequency of telemetry collection per network device in order to investigate in greater detail why the overall health state of the service indicates the failing health state.

At 1614, if the overall health state indicates a passing overall health state, assurance orchestrator 106 generates one or more service assurance messages that include (i) the identifier of the service, (ii) the overall health state that indicates the passing overall health state, and (iii) identifiers and health states of the subservices. The one or more service assurance messages do not include a request to reconfigure subservices. Assurance orchestrator 106 provides the one or more service assurance messages that do not include the request to network orchestrator 102 in flow 1502. Responsive to the one or more service assurance messages that do not include the request, network orchestrator 102 does not reconfigure any subservices.

Figure 17:
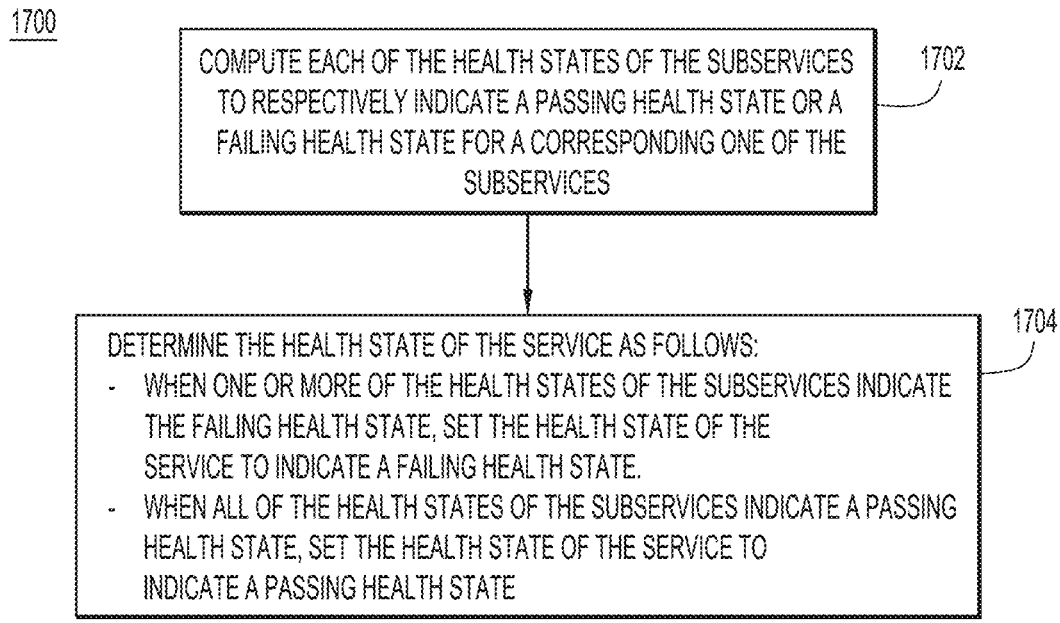
FIG. 17 shows operations expanding on an operation used to determine an overall health state of a service in the method of FIG. 16, according to an example embodiment.

With reference to FIG. 17, there are shown example operations 1700 expanding on operation 1610 used to determine the overall health state of the service in method 1600.

At 1702, assurance orchestrator 106 computes each of the health states of the subservices to respectively indicate a passing health state or a failing health state for a corresponding one of the subservices.

At 1704, assurance orchestrator 106 determines the overall health state of the service as follows:
  a. When one or more of the health states of the subservices indicate the failing health state, set the overall health state of the service to indicate a failing overall health state.
  b. When all of the health states of the subservices indicate a passing health state, set the overall health state of the service to indicate a passing overall health state.

Figure 18:
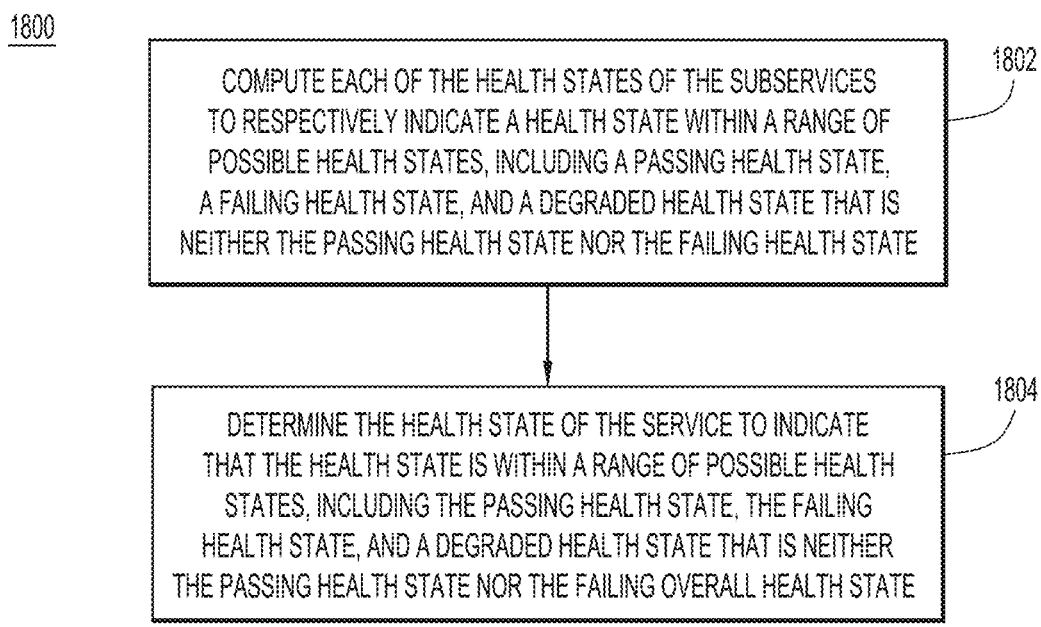
FIG. 18 shows operations expanding on the operation used to determine the overall health state of the service in the method of FIG. 16, according to an example embodiment.

With reference to FIG. 18, there are shown example operations 1800 expanding on operation 1610 used to determine the overall health state of the service in method 1600.

At 1802, compute each of the health states of the subservices, respectively, to indicate a health state within a range of possible health states, including a passing health state, a failing health state, and a degraded health state that is neither the passing health state nor the failing health state.

At 1804, determine the overall health state of the service to indicate that the overall health state is within a range of possible overall health states, including the passing overall health state, the failing overall health state, and a degraded overall health state that is neither the passing overall health state.

Figure 19:
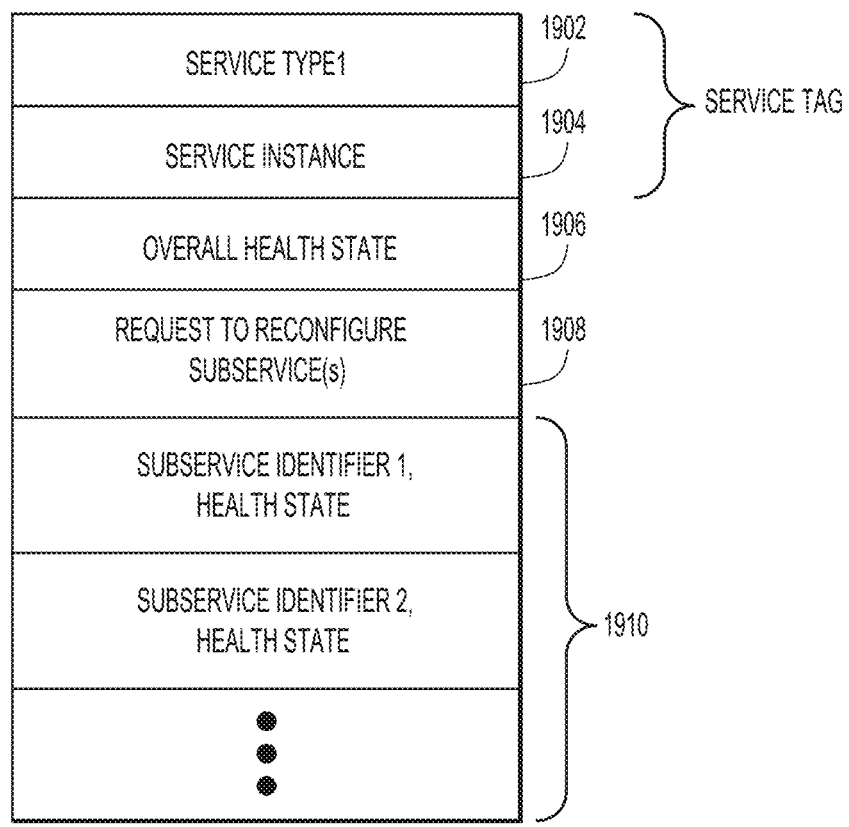
FIG. 19 is an illustration of a service assurance message used to request subservice reconfiguration in the closed loop automation for intent-based networking implemented by the service assurance system of FIG. 15, according to an example embodiment.

With reference to FIG. 19, there is an illustration of an example service assurance message 1900 that may be included in service assurance messages (flow) 1502.

Service assurance message 1900 includes a service type 1902 and a service instance 1904 that together uniquely identify a service, an overall health status 1906 of the service, a request 1908 to reconfigure one or more subservices, and identifiers and health states 1910 of the one or more services.

Computer System for Assurance Entities

Figure 20:
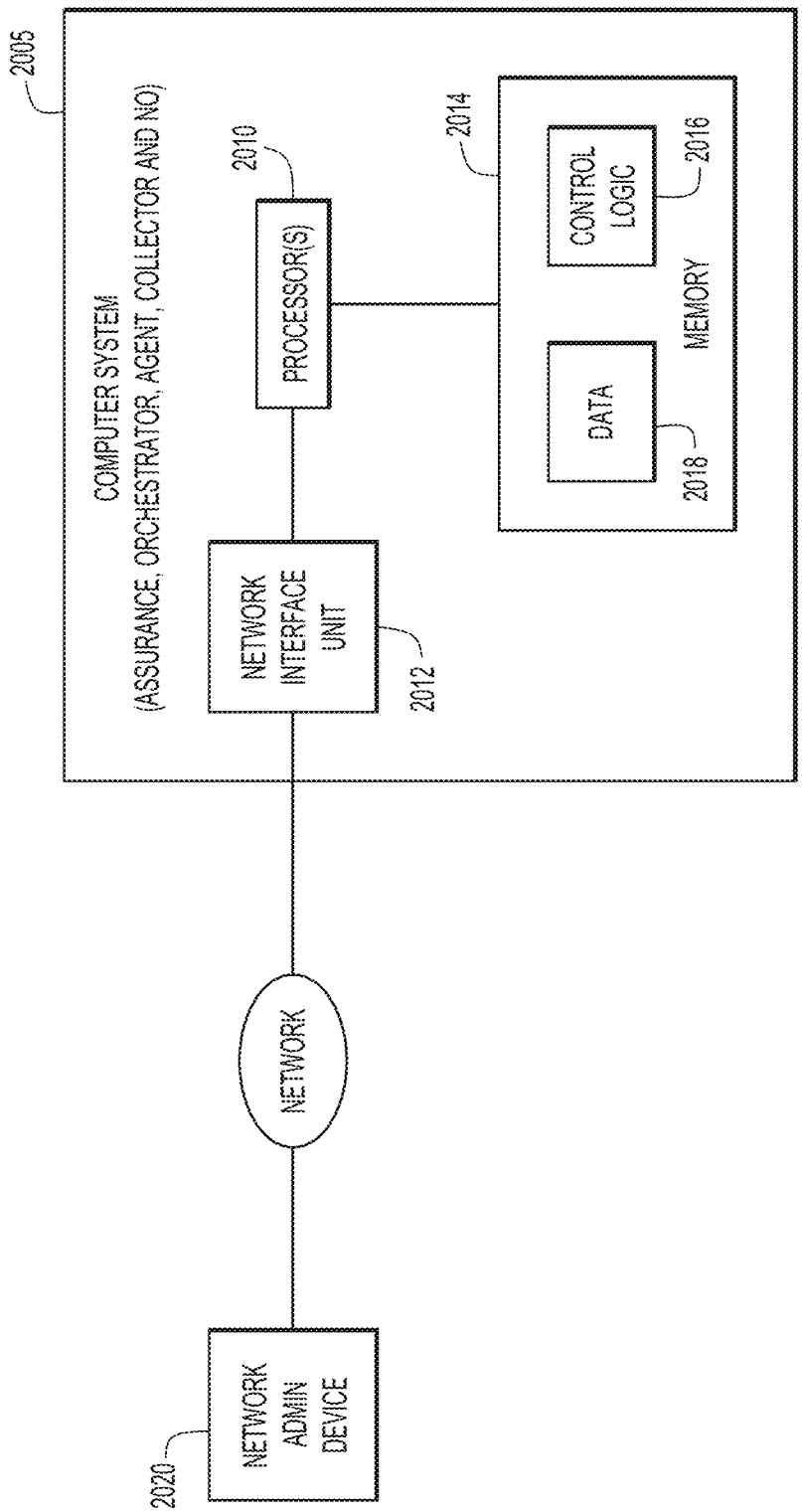
FIG. 20 is a hardware block diagram of an example computer system of a network orchestrator and an assurance entity, representative of one or more of an assurance orchestrator, assurance agents, and assurance collectors of the service assurance system, according to an example embodiment.

With reference to FIG. 20, there is shown a hardware block diagram of an example computer system 2005 of network orchestrator 102 and a service assurance entity, such as one or more of assurance orchestrator 106, assurance agents 108, and assurance collectors 110. Computer system 2005, such as a server, includes one or more processors 2010, a network interface unit (NIU) 2012 (or multiple such NIUs), and a memory 2014. Memory 2014 stores control software 2016 (referred as "control logic"), that when executed by the processor(s) 2010, causes the computer system to perform the various operations described herein for the service assurance entity and for network orchestrator 102.

The processor(s) 2010 may be a microprocessor or microcontroller (or multiple instances of such components). The NIU 2012 enables computer system 2005 to communicate over wired connections or wirelessly with a network. NIU 2012 may include, for example, an Ethernet card or other interface device having a connection port that enables computer system 2005 to communicate over the network via the connection port. In a wireless embodiment, NIU 2012 includes a wireless transceiver and an antenna to transmit and receive wireless communication signals to and from the network.

The memory 2014 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 2014 may comprise one or more tangible (non-transitory) computer readable storage media (e.g., memory device(s)) encoded with software or firmware that comprises computer executable instructions. For example, control software 2016 includes logic to implement operations performed by one or more (or all) of assurance orchestrator 106, assurance agents 108, assurance collectors 110, and network orchestrator 102. Thus, control software 2016 implements the various methods/operations described above. Control software 2016 also includes logic to implement/generate for display graphical user interfaces (GUIs) or, more generally, UIs, as necessary in connection with the above described methods/operations.

Memory 2014 also stores data 2018 generated and used by control software 2016, including network configuration information and service tags, service definitions, subservice dependency graphs, heuristic packages, monitoring and telemetry objects, subservice metrics and service-tagged subservice metrics, health states and other KPIs, mappings between the aforementioned parameters stored in memory, and so on.

A user, such as a network administrator, may interact with computer system 2005, to receive reports, change algorithms, and so on, through GUIs by way of a user device 2020 (also referred to as a "network administration device") that connects by way of a network with computer system 2005. The user device 2020 may be a personal computer (laptop, desktop), tablet computer, SmartPhone, and the like, with user input and output devices, such as a display, keyboard, mouse, and so on. Alternatively, the functionality and a display associated with user device 2020 may be provided local to or integrated with computer system 2005.

In other embodiments, the assurance entity may be implemented as one or more virtual machines (VMs) and or containers.

Figure 21:
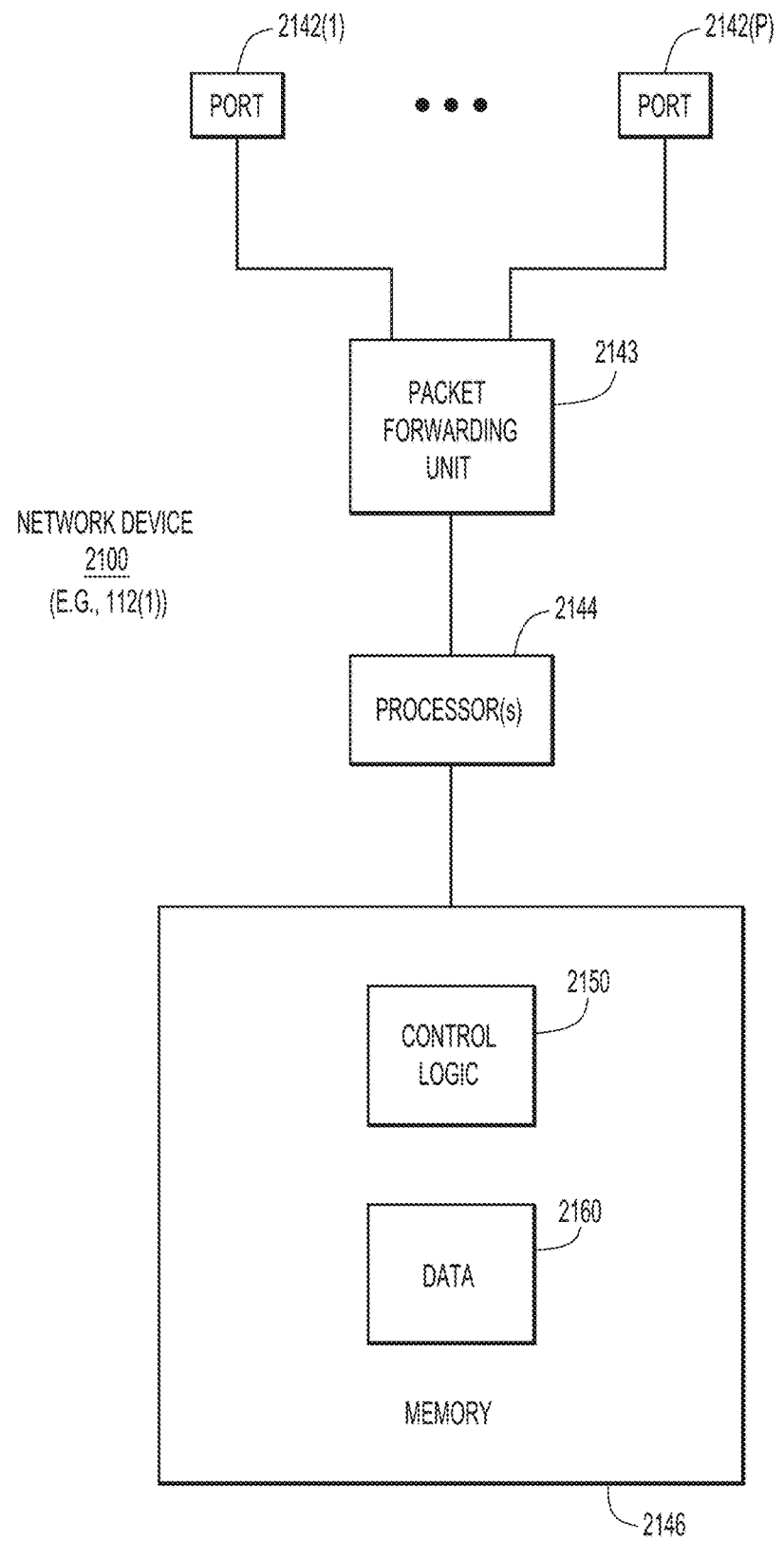
FIG. 21 is a block diagram of a network device on which a subservice may be implemented, according to an example embodiment.

With reference to FIG. 21, there is a block diagram of an example network device 2100, representative of each of network devices 112. Network device 2100 comprises a network interface unit having a plurality of network input/output (I/O) ports 2142(1)-2142(P) to send traffic to one or more networks and receive traffic from the networks, a packet forwarding/processing unit 2143, a network processor 2144 (also referred to simply as "processor"), a management port 2145 to exchange control messages with other network devices and an administration function, and a memory 2146. The packet forwarding/processing unit 2143 is, for example, one or more application specific integrated circuits (ASICs) that include packet buffers, packet queues, and other control logic for performing packet forwarding operations. The processor 2144 may include multiple processors, which may be implemented as software or hardware processors. For example, processor 2144 may include a microcontroller or microprocessor that is configured to perform higher level controls of network device 2100. To this end, the memory 2146 stores software instructions that, when executed by the processor 2144, cause the processor 2144 to perform a variety of operations including operations described herein. For example, the memory 2146 stores instructions for control logic 2150 to perform operations described herein for recording and reporting of subservice metrics, and for configuring network device 2100 responsive to network device configuration information 114. Control logic 2150 may also include logic components in packet forwarding unit 2143. Memory 2146 also stores data 2160 used and generated by logic 2150. Such data may include subservice metrics and device configuration information, for example, as described above.

In summary, embodiments presented herein, service assurance for intent-based networking (SAIN), for example, uses service tagging of subservice metrics recorded and reported by subservices of a service to help an assurance orchestrator/collector "find a needle in the haystack" with respect to identifying subservice problems that impact the service. This tagging helps the assurance orchestrator/collector assess all of the services that can be affected by particular telemetry data/sensor. The tagging facilitates specific export for data reduction, and filtering. The assurance orchestrator/collector can deterministically flag the services, including its subservices, which need user attention or can provide feedback for remediation. Example high-level operations include:

a. Get a service configuration from an assurance orchestrator. The service configuration includes a service type and a service instance.

b. Create a specific service tag from the service configuration, e.g., <service type/service instance (e.g., identifier> tuple.

c. Using the service configuration, an assurance platform, e.g., the assurance orchestrator, decomposes the service into a series of subservices for that specific service type/instance with rules of heuristic packages.

d. Tag subservices metrics with the service tag.

e. To monitor a specific customer service instance, request all tagged subservice metrics with the specific service tag.

f. When determining service performance based on key performance indicators (KPIs), in case of service degradation/failure, identify the specific component(s)/subservices that has failed based on the service tag. Reconfigure the service (or network on which the service is enabled) to avoid the fault component.

In one form, a method is provided comprising: configuring a service as a collection of subservices on network devices of a network; decomposing a definition of the service into a subservice dependency graph that indicates the subservices and dependencies between the subservices that collectively implement the service; based on the subservice dependency graph, configuring the subservices to record and report subservice metrics indicative of subservice health states of the subservices; obtaining the subservice metrics from the subservices and determining the subservice health states of the subservices based on the subservice metrics; determining a health state of the service based on the subservice health states; and reconfiguring one or more of the subservices based on the health state of the service.

In another form, a system is provided comprising: one or more network interface units; and one or more processors coupled to the one or more network interface units and configured to perform: configuring a service as a collection of subservices on network devices of a network; decomposing a definition of the service into a subservice dependency graph that indicates the subservices and dependencies between the subservices that collectively implement the service; based on the subservice dependency graph, configuring the subservices to record and report subservice metrics indicative of subservice health states of the subservices; obtaining the subservice metrics from the subservices and determining the subservice health states of the subservices based on the subservice metrics; determining a health state of the service based on the subservice health states; and reconfiguring one or more of the subservices based on the health state of the service.

In yet another form, a computer readable medium is provided. The computer readable medium stores instructions that, when executed by one or more processors coupled to one or more network interface units, cause the one or more processors to perform: configuring a service as a collection of subservices on network devices of a network; decomposing a definition of the service into a subservice dependency graph that indicates the subservices and dependencies between the subservices that collectively implement the service; based on the subservice dependency graph, configuring the subservices to record and report subservice metrics indicative of subservice health states of the subservices; obtaining the subservice metrics from the subservices and determining the subservice health states of the subservices based on the subservice metrics; determining a health state of the service based on the subservice health states; and reconfiguring one or more of the subservices based on the health state of the service.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    decomposing, by a network service assurance orchestrator device, a definition of a service into a graph that identifies a plurality of subservices and dependencies between the subservices that collectively implement the service, wherein the subservices are each hosted on respective network devices;
    obtaining subservice metrics indicative of subservice health states of the subservices;
    determining the subservice health states of the subservices based on the subservice metrics;
    determining a health state of the service based on the subservice health states;
    reconfiguring one or more of the subservices based on the health state of the service and based on reconfiguration information;
    if the health state of the service indicates a failing health state, identifying one or more of the subservices that are responsible for the failing health state;
    using an identifier of the service and identifiers of the one or more of the subservices from the identifying, retrieving subservice configuration information for the one or more of the subservices from the definition of the service; and
    generating the reconfiguration information for the one or more of the subservices from the subservice configuration information.

2. The method of claim 1, wherein the reconfiguring the one or more of the subservices includes reconfiguring one or more of:
    operations performed by the network devices;
    communication behavior of interfaces of the network devices;
    layer 1 (L1) network connectivity configured on the network devices, layer 2 (L2) network connectivity on the network devices, or layer 3 (L3) network connectivity on the network devices;
    packet routing protocols on the network devices; or
    logical network functions on the network devices.

3. The method of claim 1, wherein the reconfiguring the one or more of the subservices includes one or more of:
    rebooting the one or more of the subservices on the network devices;
    performing traffic shaping on network traffic traversing the network devices to assure a desired level of traffic throughput;
    adapting equal-cost multi-path (ECMP) routing on one or more of the network devices; or
    repairing one or more of the network devices.

4. The method of claim 1, wherein the reconfiguring the one or more of the subservices comprises repeating operations used to configure the one or more subservices.

5. The method of claim 1, wherein the definition further includes a service type and a service instance, and the method further comprises:
    generating from the service type and the service instance a service tag that is unique to the service so as to distinguish the service from other services on the network; and
    applying the service tag to the subservice metrics to produce service-tagged subservice metrics,
    wherein the determining the subservice health states includes determining the subservice health states based on the service-tagged subservice metrics.

6. The method of claim 1, wherein:
    the graph includes subservice nodes to represent the subservices and that are linked to each other in the graph; and
    the determining the health state of the service includes populating the subservice nodes with data representing respective ones of the subservice health states; and
    the method further includes searching the subservice nodes for ones of the subservice health states that indicate a failing subservice health state.

7. The method of claim 1, further comprising:
    if the health state of the service indicates a passing health state, not performing the reconfiguring.

8. The method of claim 1, wherein:
    each of the subservice health states respectively indicates a passing subservice health state or a failing subservice health state for a corresponding one of the subservices; and the determining the health state of the service includes:
when one or more of the subservice health states indicate the failing subservice health state, setting the health state of the service to indicate a failing health state; and
when all of the subservice health states indicate a passing subservice health state, setting the health state of the service to indicate a passing health state.

9. The method of claim 8, further comprising identifying the one or more of the subservices, wherein the identifying includes identifying the one or more of the subservices as the subservices having subservice health states that indicate the failing subservice health state.

10. The method of claim 1, wherein:
each of the subservice health states respectively indicates a subservice health state within a range of possible subservice health states including a passing subservice health state, a failing subservice health state, and a degraded subservice health state that is neither the passing subservice health state nor the failing subservice health state; and
the determining the health state of the service includes determining the health state of the service to indicate the health state is within a range of possible health states including the passing subservice health state, the failing subservice health state, and a degraded subservice health state that is neither the passing subservice health state nor the failing subservice health state.

11. A system comprising:
one or more network interface units; and
one or more processors coupled to the one or more network interface units and configured to perform:
decomposing, by a network service assurance orchestrator device, a definition of a service into a graph that identifies a plurality of subservices and dependencies between the subservices that collectively implement the service, wherein the subservices are each hosted on respective network devices;
obtaining subservice metrics indicative of subservice health states of the subservices;
determining the subservice health states of the subservices based on the subservice metrics;
determining a health state of the service based on the subservice health states;
reconfiguring one or more of the subservices based on the health state of the service and based on reconfiguration information;
if the health state of the service indicates a failing health state, identifying one or more of the subservices that are responsible for the failing health state;
using an identifier of the service and identifiers of the one or more of the subservices from the identifying, retrieving subservice configuration information for the one or more of the subservices from the definition of the service; and
generating the reconfiguration information for the one or more of the subservices from the subservice configuration information.

12. The system of claim 11, wherein the one or more processors are configured to perform the reconfiguring the one or more of the subservices by reconfiguring one or more of:
operations performed by the network devices;
communication behavior of interfaces of the network devices;
layer 1 (L1) network connectivity configured on the network devices, layer 2 (L2) network connectivity on the network devices, or layer 3 (L3) network connectivity on the network devices;
packet routing protocols on the network devices; or
logical network functions on the network devices.

13. The system of claim 11, wherein the one or more processors are configured to perform the reconfiguring the one or more of the subservices by reconfiguring one or more of:
rebooting the one or more of the subservices on the network devices;
performing traffic shaping on network traffic traversing the network devices to assure a desired level of traffic throughput;
adapting equal-cost multi-path (ECMP) routing on one or more of the network devices; or
repairing one or more of the network devices.

14. The system of claim 11, wherein the reconfiguring the one or more of the subservices comprises repeating operations used to configure the one or more subservices.

15. The system of claim 11, wherein the definition further includes a service type and a service instance, and the one or more processors further configured to perform:
generating from the service type and the service instance a service tag that is unique to the service so as to distinguish the service from other services on the network; and
applying the service tag to the subservice metrics to produce service-tagged subservice metrics,
wherein the determining the subservice health states includes determining the subservice health states based on the service-tagged subservice metrics.

16. The system of claim 11, wherein:
the graph includes subservice nodes to represent the subservices and that are linked to each other in the graph; and
the one or more processors are further configured to perform the determining the health state of the service by populating the subservice nodes with data representing respective ones of the subservice health states; and
the one or more processors are further configured to perform searching the subservice nodes for ones of the subservice health states that indicate a failing subservice health state.

17. The system of claim 11, wherein the one or more processors are configured to perform:
if the health state of the service indicates a passing health state, not performing the reconfiguring.

18. The system of claim 11, wherein:
each of the subservice health states respectively indicates a passing subservice health state or a failing subservice health state for a corresponding one of the subservices; and
the one or more processors are further configured to perform the determining the health state of the service by:
when one or more of the subservice health states indicate the failing subservice health state, setting the health state of the service to indicate a failing health state; and
when all of the subservice health states indicate a passing subservice health state, setting the health state of the service to indicate a passing health state.

19. The system of claim 18, wherein the one or more processors are further configured to perform identifying the one or more of the subservices, wherein the identifying includes identifying the one or more of the subservices as the subservices having subservice health states that indicate the failing subservice health state.

20. The system of claim 11, wherein:
   each of the subservice health states respectively indicates a subservice health state within a range of possible subservice health states including a passing subservice health state, a failing subservice health state, and a degraded subservice health state that is neither the passing subservice health state nor the failing subservice health state; and
   the one or more processors further configured to perform the determining the health state of the service by determining the health state of the service to indicate the health state is within a range of possible health states including the passing subservice health state, the failing subservice health state, and a degraded subservice health state that is neither the passing subservice health state nor the failing subservice health state.

* * * * *